US011888769B2

(12) United States Patent
Nam et al.

(10) Patent No.: US 11,888,769 B2
(45) Date of Patent: Jan. 30, 2024

(54) UPLINK REFERENCE SIGNAL-BASED FREQUENCY OFFSET PRE-COMPENSATION

(71) Applicant: QUALCOMM Incorporated, San Diego, CA (US)

(72) Inventors: Wooseok Nam, San Diego, CA (US); Tao Luo, San Diego, CA (US); Jing Sun, San Diego, CA (US); Xiaoxia Zhang, San Diego, CA (US); Juan Montojo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/504,750

(22) Filed: Oct. 19, 2021

(65) Prior Publication Data
US 2022/0131664 A1    Apr. 28, 2022

Related U.S. Application Data

(60) Provisional application No. 63/105,095, filed on Oct. 23, 2020.

(51) Int. Cl.
*H04L 5/08* (2006.01)
*H04L 5/00* (2006.01)
(Continued)

(52) U.S. Cl.
CPC .......... *H04L 5/0032* (2013.01); *H04L 5/0051* (2013.01); *H04W 72/0453* (2013.01); *H04W 72/23* (2023.01)

(58) Field of Classification Search
CPC ... H04L 5/0023; H04L 5/0032; H04L 5/0035; H04L 5/0048; H04L 5/0051;
(Continued)

(56) References Cited

U.S. PATENT DOCUMENTS

2020/0374079 A1\* 11/2020 Chervyakov ....... H04L 27/2657
2021/0377774 A1\* 12/2021 Yu ........................ H04B 7/024
(Continued)

OTHER PUBLICATIONS

CMCC: "Enhancements on HST-SFN Deployment", 3GPP Draft, 3GPP TSG RAN WG1 #102-e, R1-2006204, 3rd Generation Partnership Project (3GPP), Mobile Competence Centre, 650, Route Des Lucioles, F-06921 Sophia-Antipolis Cedex, France, vol. RAN WG1, No. e-Meetinq, Aug. 17, 2020-Aug. 28, 2020, Aug. 7, 2020 (Aug. 7, 2020), XP051915244, 11 Pages, Retrieved from the Internet: URL: https://ftp.3gpp.org/tsg_ran/WG1_RL1/TSGR1_102-e/Docs/R1-2006204.zip [retrieved on Aug. 7, 2020] section 3.1.
(Continued)

*Primary Examiner* — Siu M Lee
(74) *Attorney, Agent, or Firm* — Holland & Hart LLP/Qualcomm Incorporated

(57) ABSTRACT

Methods, systems, and devices for wireless communications are described. A user equipment (UE) may determine, based at least in part on a first downlink reference signal transmitted from a first base station using a downlink reference signal frequency, a first frequency offset associated with transmissions between the UE and the first base station. The UE may determine, based at least in part on a second downlink reference signal transmitted from a second base station using the downlink reference signal frequency, a second frequency offset associated with transmissions between the UE and the second base station. The UE may transmit, to the first base station and the second base station, at least one uplink reference signal using an uplink reference signal frequency that is based at least in part on the first frequency offset and the second frequency offset.

24 Claims, 16 Drawing Sheets

(51) Int. Cl.
*H04W 72/0453* (2023.01)
*H04W 72/23* (2023.01)

(58) Field of Classification Search
CPC ............ H04L 5/0094; H04W 72/0453; H04W 72/23; H04B 7/0456; H04B 7/0695
See application file for complete search history.

(56) References Cited

U.S. PATENT DOCUMENTS

| | | | | |
|---|---|---|---|---|
| 2023/0069193 A1* | 3/2023 | Flordelis | ............ | H04W 74/0833 |
| 2023/0133979 A1* | 5/2023 | Sun | ........................ | H04L 5/0051 370/329 |
| 2023/0179370 A1* | 6/2023 | Wang | .................... | H04L 5/0048 370/329 |

OTHER PUBLICATIONS

Intel Corporation: "On HST SFN Enhancements", 3GPP Draft, 3GPP TSG RAN WG1 Meeting #102-e, R1-2005862, 3rd Generation Partnership Project (3GPP), Mobile Competence Centre, 650, Route Des Lucioles, F-06921 Sophia-Antipolis Cedex, France, vol. RAN WG1 No. e-Meetinq, Aug. 17, 2020-Aug. 28, 2020, Aug. 8, 2020 (Aug. 8, 2020), XP051917763, 10 Pages, Retrieved from the Internet: URL: https://ftp.3gpp.org/tsg_ran/WG1_RL1/TSGR1_102-e/Docs/R1-2005862.zip [Retrieved on Aug. 8, 2020] Section 3.
International Search Report and Written Opinion—PCT/US2021/055805—ISA/EPO—dated Jan. 27, 2022.
Qualcomm Incorporated: "Enhancements on HST-SFN Deployment", 3GPP Draft, 3GPP TSG-RAN WG1 Meeting #102-e, R1-2006794, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020 (Aug. 8, 2020), XP051918244, 15 pages, Retrieved from the Internet: URL: https://ftp.3gpp.org/tsg_ran/WG1_RL1/TSGR1_102-e/Docs/R1-2006794.zip [retrieved on Aug. 8, 2020] sections 4.1 and 4.3, figures 4-3.

* cited by examiner

UPLINK REFERENCE SIGNAL-BASED FREQUENCY OFFSET PRE-COMPENSATION

CROSS REFERENCE

The present application for patent claims the benefit of U.S. Provisional Patent Application No. 63/105,095 by NAM et al., entitled "UPLINK REFERENCE SIGNAL-BASED FREQUENCY OFFSET PRE-COMPENSATION," filed Oct. 23, 2020, assigned to the assignee hereof, and expressly incorporated by reference herein.

FIELD OF TECHNOLOGY

The following relates to wireless communications, including uplink reference signal-based frequency offset pre-compensation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink reference signal-based frequency offset pre-compensation. Broadly, aspects of the described techniques support various mechanisms that support a sounding reference signal (SRS) being used to assist in a frequency offset pre-compensation processing in a single-frequency network (SFN) scenario. In the SFN scenario, two base stations may each transmit a downlink reference signal (DL-RS) to a user equipment (UE) (e.g., a UE associated with a high rate of speed, traveling along a path, etc.). The DL-RSs may be transmitted using the same frequency (e.g., a DL-RS center frequency). The UE receives the two different DL-RSs from the base station and determines respective frequency offsets for each DL-RS (e.g., for each of the two base stations). Based on the different frequency offsets, the UE may select a frequency to be used to transmit an uplink reference signal (UL-RS) transmission, such as an SRS transmission, to the different base stations. The UE may use a weighting factor in selecting the UL-RS frequency (with different or the same weighting factors corresponding to the different base stations). The UL-RS may be frequency shifted at least some degree from the DL-RS center frequency based on the corresponding frequency offsets and, when applicable, the weighting factor. The base stations receiving the SRS transmissions from the UE may use the received SRS frequency (e.g., the UL-RS center frequency) to determine a frequency shift for pre-compensating a data transmission to the UE. That is, the base station(s) performing the downlink data transmission to the UE may select a frequency for the downlink data transmission based on the UL-RS frequency (e.g., perform frequency offset pre-compensation based on the UL-RS to identify or otherwise select a receive frequency for the downlink data transmission to the UE). Accordingly, the base station(s) may perform the downlink data transmission to the UE using the received center frequency in order to mitigate, or eliminate when possible, the different frequency offsets from the base stations. This may enable to the UE receive the downlink data transmission (and perform other communications with the base stations) using the received center frequency. The described techniques may be used to continuously and/or as needed update the received center frequency to be used for communications with the UE based on UE mobility, according to a periodic and/or aperiodic schedule, and the like.

A method of wireless communication at a UE is described. The method may include determining, based on a first downlink reference signal transmitted from a first base station using a downlink reference signal frequency, a first frequency offset associated with transmissions between the UE and the first base station, determining, based on a second downlink reference signal transmitted from a second base station using the downlink reference signal frequency, a second frequency offset associated with transmissions between the UE and the second base station, transmitting, to the first base station and the second base station, at least one uplink reference signal using an uplink reference signal frequency that is based on the first frequency offset and the second frequency offset, and receiving a downlink data transmission from the first base station or the second base station at a receive frequency that is based on the uplink reference signal frequency.

An apparatus for wireless communication at a UE is described. The apparatus may include a processor, memory coupled with the processor, and instructions stored in the memory. The instructions may be executable by the processor to cause the apparatus to determine, based on a first downlink reference signal transmitted from a first base station using a downlink reference signal frequency, a first frequency offset associated with transmissions between the UE and the first base station, determine, based on a second downlink reference signal transmitted from a second base station using the downlink reference signal frequency, a second frequency offset associated with transmissions between the UE and the second base station, transmit, to the first base station and the second base station, at least one uplink reference signal using an uplink reference signal frequency that is based on the first frequency offset and the second frequency offset, and receive a downlink data transmission from the first base station or the second base station at a receive frequency that is based on the uplink reference signal frequency.

Another apparatus for wireless communication at a UE is described. The apparatus may include means for determining, based on a first downlink reference signal transmitted from a first base station using a downlink reference signal frequency, a first frequency offset associated with transmissions between the UE and the first base station, determining, based on a second downlink reference signal transmitted from a second base station using the downlink reference signal frequency, a second frequency offset associated with transmissions between the UE and the second base station, transmitting, to the first base station and the second base station, at least one uplink reference signal using an uplink reference signal frequency that is based on the first frequency offset and the second frequency offset, and receiving a downlink data transmission from the first base station or the second base station at a receive frequency that is based on the uplink reference signal frequency.

A non-transitory computer-readable medium storing code for wireless communication at a UE is described. The code may include instructions executable by a processor to determine, based on a first downlink reference signal transmitted from a first base station using a downlink reference signal frequency, a first frequency offset associated with transmissions between the UE and the first base station, determine, based on a second downlink reference signal transmitted from a second base station using the downlink reference signal frequency, a second frequency offset associated with transmissions between the UE and the second base station, transmit, to the first base station and the second base station, at least one uplink reference signal using an uplink reference signal frequency that is based on the first frequency offset and the second frequency offset, and receive a downlink data transmission from the first base station or the second base station at a receive frequency that is based on the uplink reference signal frequency.

Some examples of the method, apparatuses, and non-transitory computer-readable medium described herein may further include operations, features, means, or instructions for identifying a weighting factor to be applied to the first frequency offset, the second frequency offset, or both, and determining the uplink reference signal frequency based on the first frequency offset, the second frequency offset, and the weighting factor.

Some examples of the method, apparatuses, and non-transitory computer-readable medium described herein may further include operations, features, means, or instructions for receiving a configuration signal indicating the weighting factor.

Some examples of the method, apparatuses, and non-transitory computer-readable medium described herein may further include operations, features, means, or instructions for receiving a configuration signal identifying the downlink reference signal frequency.

Some examples of the method, apparatuses, and non-transitory computer-readable medium described herein may further include operations, features, means, or instructions for transmitting, autonomously by the UE, the uplink reference signal using the uplink reference signal frequency in response to determining the first frequency offset and the second frequency offset.

Some examples of the method, apparatuses, and non-transitory computer-readable medium described herein may further include operations, features, means, or instructions for receiving a trigger message triggering transmission of the uplink reference signal using the uplink reference signal frequency.

Some examples of the method, apparatuses, and non-transitory computer-readable medium described herein may further include operations, features, means, or instructions for identifying a first uplink spatial filter configuration for transmitting the at least one uplink reference signal to the first base station based on a first downlink spatial filter configuration associated with the first downlink reference signal and a second downlink spatial filter configuration associated with the second downlink reference signal, and transmitting the uplink reference signal to the first base station to the second base station, or both, based on the first uplink spatial filter configuration.

In some examples of the method, apparatuses, and non-transitory computer-readable medium described herein, the first downlink spatial filter configuration, the second downlink spatial filter configuration, or both, may be identified based on a downlink transmission configuration indicator (TCI).

In some examples of the method, apparatuses, and non-transitory computer-readable medium described herein, the first uplink spatial filter configuration may be associated with the first downlink spatial filter configuration and the second downlink spatial configuration based on a spatial relation information indication, an uplink TCI, or both.

Some examples of the method, apparatuses, and non-transitory computer-readable medium described herein may further include operations, features, means, or instructions for receiving a grant scheduling the downlink data transmission, and identifying a spatial filter configuration for a demodulation reference signal transmitted in conjunction with the downlink data transmission based on the grant.

Some examples of the method, apparatuses, and non-transitory computer-readable medium described herein may further include operations, features, means, or instructions for determining a weighted average of the first frequency offset and the second frequency offset, and identifying the uplink reference signal frequency based on the weighted average.

A method of wireless communication at a first base station is described. The method may include transmitting, to a UE, a first downlink reference signal using a downlink reference signal frequency, receiving, from the UE, at least one uplink reference signal using an uplink reference signal frequency that is based on a first frequency offset associated with transmissions between the UE and the first base station and a second frequency offset associated with transmissions between the UE and a second base station, and transmitting a downlink data transmission to the UE at a receive frequency for the UE that is based on the uplink reference signal frequency.

An apparatus for wireless communication at a first base station is described. The apparatus may include a processor, memory coupled with the processor, and instructions stored in the memory. The instructions may be executable by the processor to cause the apparatus to transmit, to a UE, a first downlink reference signal using a downlink reference signal frequency, receive, from the UE, at least one uplink reference signal using an uplink reference signal frequency that is based on a first frequency offset associated with transmissions between the UE and the first base station and a second frequency offset associated with transmissions between the UE and a second base station, and transmit a downlink data transmission to the UE at a receive frequency for the UE that is based on the uplink reference signal frequency.

Another apparatus for wireless communication at a first base station is described. The apparatus may include means for transmitting, to a UE, a first downlink reference signal using a downlink reference signal frequency, receiving, from the UE, at least one uplink reference signal using an uplink reference signal frequency that is based on a first frequency offset associated with transmissions between the UE and the first base station and a second frequency offset associated with transmissions between the UE and a second base station, and transmitting a downlink data transmission to the UE at a receive frequency for the UE that is based on the uplink reference signal frequency.

A non-transitory computer-readable medium storing code for wireless communication at a first base station is described. The code may include instructions executable by a processor to transmit, to a UE, a first downlink reference signal using a downlink reference signal frequency, receive, from the UE, at least one uplink reference signal using an uplink reference signal frequency that is based on a first frequency offset associated with transmissions between the UE and the first base station and a second frequency offset associated with transmissions between the UE and a second base station, and transmit a downlink data transmission to the UE at a receive frequency for the UE that is based on the uplink reference signal frequency.

Some examples of the method, apparatuses, and non-transitory computer-readable medium described herein may further include operations, features, means, or instructions for transmitting, to the UE, a configuration signal indicating a weighting factor to be applied to the first frequency offset, the second frequency offset, or both, where the UE determines the uplink reference signal frequency based on the first frequency offset, the second frequency offset, and the weighting factor.

Some examples of the method, apparatuses, and non-transitory computer-readable medium described herein may further include operations, features, means, or instructions for transmitting a configuration signal identifying the downlink reference signal frequency.

In some examples of the method, apparatuses, and non-transitory computer-readable medium described herein, the UE autonomously transmits the uplink reference signal using the uplink reference signal frequency in response to the UE determining the first frequency offset and the second frequency offset.

Some examples of the method, apparatuses, and non-transitory computer-readable medium described herein may further include operations, features, means, or instructions for transmitting, to the UE, a trigger message triggering transmission of the uplink reference signal using the uplink reference signal frequency.

Some examples of the method, apparatuses, and non-transitory computer-readable medium described herein may further include operations, features, means, or instructions for receiving the uplink reference signal from the UE based on a first uplink spatial filter configuration, where the first uplink spatial filter configuration for receiving the uplink reference signal from the UE may be based on a first downlink spatial filter configuration associated with the first downlink reference signal.

Some examples of the method, apparatuses, and non-transitory computer-readable medium described herein may further include operations, features, means, or instructions for transmitting an indication of a downlink spatial relation information indication, an uplink TCI, or both, where the first downlink spatial filter configuration may be based on the indication.

Some examples of the method, apparatuses, and non-transitory computer-readable medium described herein may further include operations, features, means, or instructions for receiving a grant scheduling the downlink data transmission, where a spatial filter configuration for a demodulation reference signal transmitted in conjunction with the downlink data transmission based on the grant.

Some examples of the method, apparatuses, and non-transitory computer-readable medium described herein may further include operations, features, means, or instructions for identifying the receive frequency based on a weighted average of the first frequency offset and the second frequency offset, where the receive frequency may be based on the weighted average.

Some examples of the method, apparatuses, and non-transitory computer-readable medium described herein may further include operations, features, means, or instructions for identifying a difference between the uplink reference signal frequency and the downlink reference signal frequency, and identifying the receive frequency for the downlink data transmission to the UE based on the difference.

Some examples of the method, apparatuses, and non-transitory computer-readable medium described herein may further include operations, features, means, or instructions for coordinating with the second base station to identify the receive frequency to use for the downlink data transmission to the UE.

DETAILED DESCRIPTION

Figure 1:
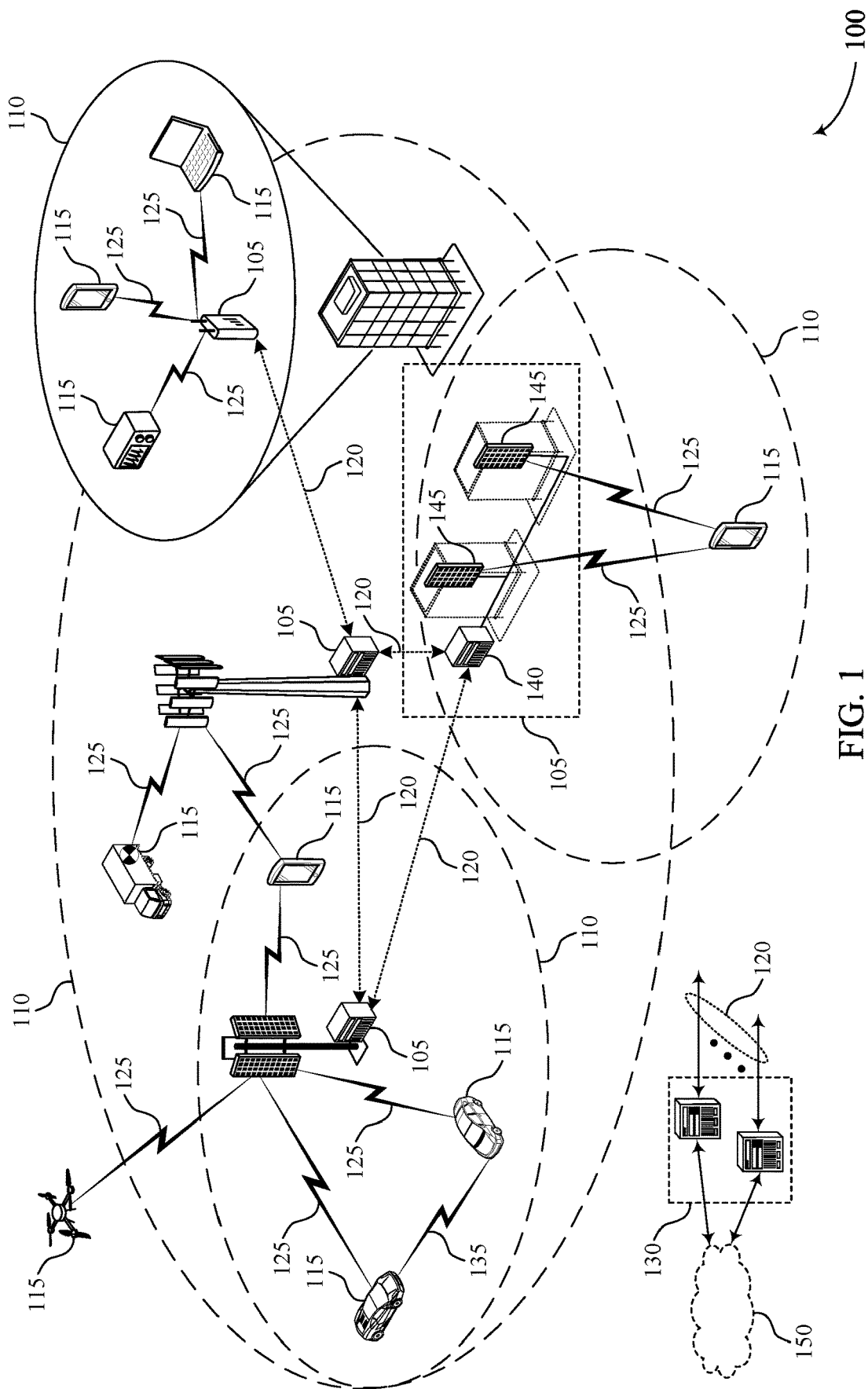
FIG. 1 illustrates an example of a system for wireless communications that supports uplink reference signal-based frequency offset pre-compensation in accordance with aspects of the present disclosure.

Some wireless communications systems may use a single-frequency network (SFN) where multiple base stations or transmission/reception points (TRPs) use the same center frequency for downlink transmissions to a user equipment (UE). In some instances (for example, when a base station transmits a synchronization signal block (SSB)), the different base stations or TRPs may transmit the same SSB on the same frequency to a same spatial location. An SFN may be used, for example, for communications with one or more UEs on a train. The UEs on the train and/or otherwise associated with the train (e.g., a UE implemented on the train to provide connectivity) may receive an SSB from both a first base station and a second base station. Because the base stations may coordinate with each other, the SSBs received simultaneously from different base stations may share the same SSB identifier.

However, in this high speed train scenario, the train/UE may move so quickly that the Doppler effect may become problematic. One of the signals received at the train may experience a large frequency offset in one direction (because the train/UE is moving quickly away from the base station) while the other signal experiences a large frequency offset in a different direction (because the train/UE is moving quickly towards the base station). Accordingly, aspects of the described techniques provide various mechanisms that support frequency offset pre-compensation performed at the base stations.

Aspects of the disclosure are initially described in the context of wireless communications systems. Generally, the described techniques provide various mechanisms that support wireless communications in a wireless network. Broadly, aspects of the described techniques support various mechanisms that support a sounding reference signal (SRS) being used to assist in frequency offset pre-compensation processing in an SFN scenario. In the SFN scenario, two base stations may each transmit a downlink reference signal (DL-RS) to a UE (e.g., a UE associated with a high rate of speed, traveling along a path, etc.). The DL-RSs may be transmitted using the same reference frequency (e.g., a DL-RS or carrier center frequency). The UE receives the two different DL-RSs from the base stations and determines respective frequency offsets for each DL-RS (e.g., for each of the two base stations). Based on the different frequency offsets, the UE may select a frequency to be used to transmit an uplink reference signal (UL-RS) transmission, such as an SRS transmission, to the different base stations. The UE may use a weighting factor in selecting the UL-RS frequency (with different or the same weighting factors corresponding to the different base stations). The UL-RS may be frequency shifted at least some degree from the DL-RS or carrier center frequency based on the corresponding frequency offsets and, when applicable, the weighting factor. The base stations receiving the SRS transmissions from the UE may use the received SRS frequency (e.g., the UL-RS center frequency) to determine a frequency shift for pre-compensating a data transmission to the UE. That is, the base station(s) performing the downlink data transmission to the UE may select a frequency for the downlink data transmission based on the UL-RS frequency (e.g., perform frequency offset pre-compensation based on the UL-RS to identify or otherwise select a receive frequency for the downlink data transmission to the UE). Accordingly, the base station(s) may perform the downlink data transmission to the UE using the received center frequency in order to mitigate, or eliminate when possible, the different frequency offsets from the base stations. This may enable to the UE receive the downlink data transmission (and perform other communications with the base stations) using the received center frequency. The described techniques may be used to continuously and/or as needed update the received center frequency to be used for communications with the UE based on UE mobility, according to a periodic and/or aperiodic schedule, and the like.

Aspects of the disclosure are further illustrated by and described with reference to apparatus diagrams, system diagrams, and flowcharts that relate to uplink reference signal-based frequency offset pre-compensation.

FIG. 1 illustrates an example of a wireless communications system 100 that supports uplink reference signal-based frequency offset pre-compensation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may determine, based at least in part on a first downlink reference signal transmitted from a first base station using a downlink reference signal center frequency, a first frequency offset associated with transmissions between the UE 115 and the first base station. The UE 115 may determine, based at least in part on a second downlink reference signal transmitted from a second base station using the downlink reference signal center frequency, a second frequency offset associated with transmissions between the UE 115 and the second base station. The UE 115 may transmit, to the first base station and the second base station, at least one uplink reference signal using an uplink reference signal center frequency that is based at least in part on the first frequency offset and the second frequency offset. The UE 115 may receive a downlink data transmission from the first base station or the second base station at a received center frequency that is based at least in part on the uplink reference signal center frequency.

A base station 105 (which may be the first base station and/or the second base station in the example above) may transmit, to a UE 115, a first downlink reference signal using a downlink reference signal center frequency. The base station 105 may receive, from the UE 115, at least one uplink reference signal at a received center frequency that is based at least in part on a first frequency offset associated with transmissions between the UE 115 and the first base station and a second frequency offset associated with transmissions between the UE 115 and a second base station. The base station 105 may transmit a downlink data transmission to the UE 115 using a downlink data transmission center frequency that pre-compensates for at least the first frequency offset, wherein the downlink data transmission center frequency is based at least in part on the received center frequency.

Figure 2:
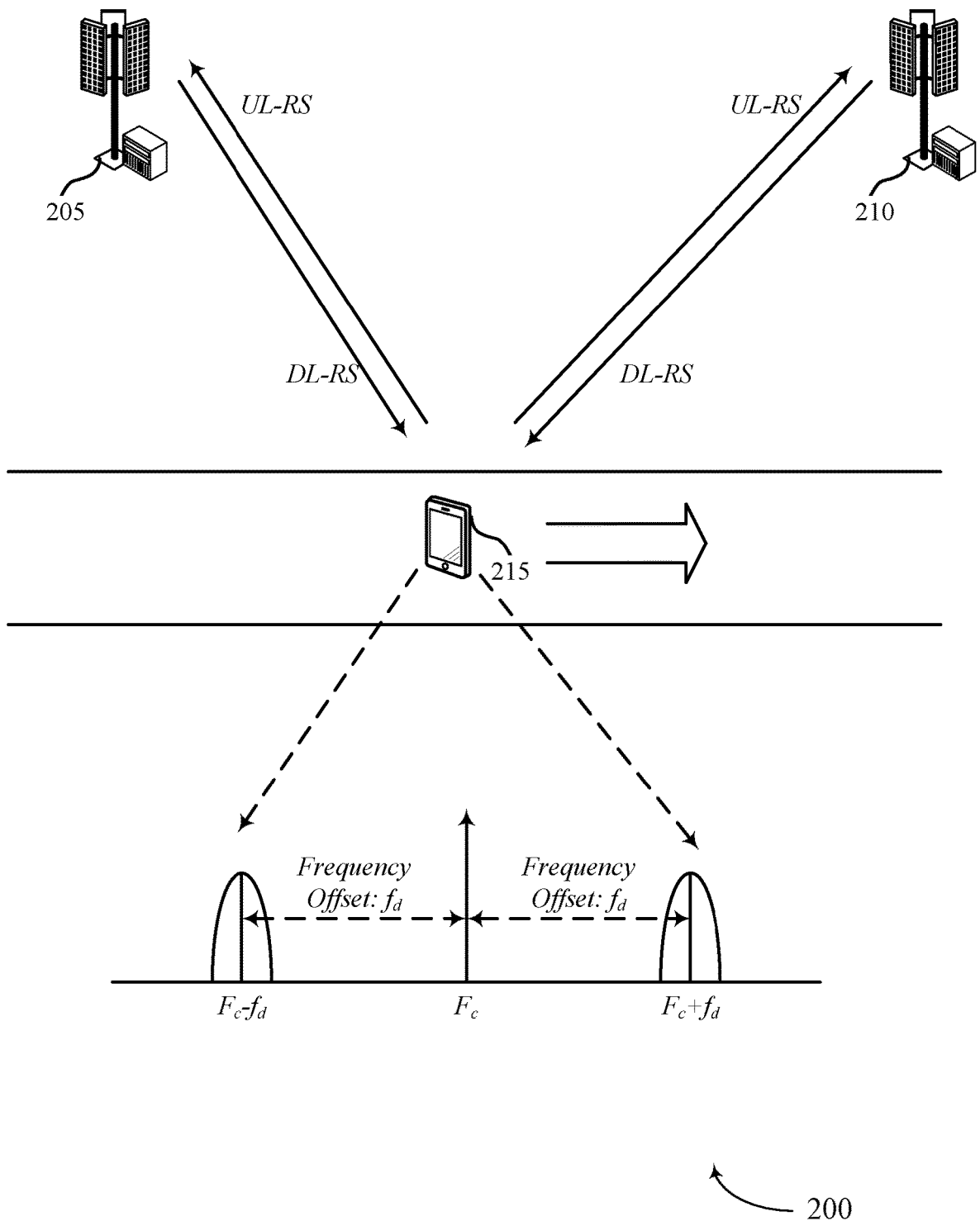
FIG. 2 illustrates an example of a wireless communication system that supports uplink reference signal-based frequency offset pre-compensation in accordance with aspects of the present disclosure.

FIG. 2 illustrates an example of a wireless communication system 200 that supports uplink reference signal-based frequency offset pre-compensation in accordance with aspects of the present disclosure. In some examples, wireless communication system 200 may implement aspects of wireless communication system 100. Wireless communication system 200 may include base station 205, base station 210, and/or UE 215, which may be examples of the corresponding devices described herein. In some aspects, wireless communication system 200 may support SFN communications. In some aspects, base station 205 and base station 210 may be examples of TRPs and/or remote radio heads (RRHs), which may be associated with the same base station (e.g., coordinated) or may be associated with separate base stations (e.g., non-coordinated).

An SFN transmission may include the same signal being simultaneously transmitted for multiple spatially dispersed base stations (e.g., such as base station 205 and base station 210, which may be examples of such TRPs/RRHs). In some aspects, there may be no joint processing of the transmitted signals (e.g., layer splitting, joint pre-coding, and the like) to be applied. The receiver (e.g., UE 215 in this example) may attain macro diversity and/or frequency diversity gain in the SFN scenario. For an SFN transmission using beamforming, the same transmitted signal may be simultaneously or sequentially transmitted over multiple beams from the same and/or different TRPs.

Within wireless communication system 200, single-TRP communication and SFN-communications may coexist. For example, SFN may be suitable for some deployment scenarios where mobility management may be problematic (e.g., such as a high-speed train scenario where the UE/train is moving at speeds of 500 km/h or more). SFN may be suitable for some service types, such as broadcast/multicast services and/or traffic. Such SFN communications may be area, direction, and/or beam-specific. For example, the SSB transmission in the high-speed train SFN scenario may occur. For some SSB occasions (e.g., those on TRP boundaries), multiple TRPs may transmit simultaneously using the same SSB identifier. The multiple transmit beams for an SFN SSB may be designated to be focused/overlapped on a single point/region on the path of the high-speed train to maximize gain.

In the high-speed train SFN scenario, the Doppler shift from the two (or more) SFN TRPs may produce two comparably strong and widely separated frequency offset components and the receive signal (e.g., frequency offset (fa) with respect to the center frequency (Fe)). For example, line of sight (LoS) communications may be dominant in a typical high-speed train deployment (e.g., rural, dedicated linear deployment along the Railway line). A two-tap high-speed train SFN channel model may be utilized. Due to non-rich scattering in high Doppler shift, the spectrum for SFN signals at the TRP boundaries may have two dominant modes at offset frequencies (e.g., $\pm f_d$), such as a high speed train Doppler power spectral density (PSD) (as shown in FIG. 2). The frequency separation between the two components may be given by the difference in Doppler shift. The channel estimation in Doppler compensation becomes more problematic in this mixed offset scenario.

Accordingly, aspects of the described techniques may provide various techniques to support frequency offset pre-compensation as a solution to address the mixed Doppler shift issue. The frequency offset pre-compensation may allow each TRP (e.g., base station 205 and/or base station 210) to pre-rotate the transmitted signal by the amount of Doppler shift received per-signal at UE 215 becomes Doppler free or minimizes the Doppler shift to within a minimal or at least manageable level. In some aspects, the described techniques provide an SRS-based frequency offset pre-compensation procedure implemented between base station 205, base station 210, and UE 215 to eliminate or otherwise mitigate Doppler shift.

For example, base station 205 (which may be considered a first base station/TRP/RRH in this example) and base station 210 (which may be considered a second base station/TRP/RRH in this example) may transmit a corresponding first and second DL-RSs to UE 215 using a DL-RS center frequency (e.g., Fe). The DL-RS may correspond to any signal transmitted by base station 205 and base station 210. For example, DL-RS may correspond to a tracking reference signal (TRS), a channel state information reference signal (CSI-RS), a beam management reference signal (BMRS), a synchronization signal, an SSB signal, and the like. Base station 205 and/or base station 210 may transmit or otherwise convey an indication of a configuration signal to UE 215 identifying various aspects of the DL-RS. For example, the configuration signal may identify the DL-RS center frequency, timing information, spatial information, and the like, associated with the corresponding DL-RS transmissions.

In some aspects, for frequency offset (e.g., Doppler shift) measurements, the DL-RS (e.g., TRS) resources from each SFN base station/TRP/RRH may be used. The DL-RS pair may be bundled into a single resource set, with the transmissions being triggered together according to an aperiodic, semi-persistent, and/or aperiodic manner.

UE 215 may receive and determine (e.g., measure and/or estimate) the first DL-RS transmitted from the first base station (e.g., base station 205) to identify or otherwise determine a first frequency offset (e.g., $F_c-f_d$) associated with transmissions between UE 215 and the first base station. UE 215 may receive and measure the second DL-RS transmitted from the second base station (e.g., base station 210) to identify or otherwise determine a second frequency offset (e.g., $F_c+f_d$) associated with transmissions between UE 215 and the second base station. In some aspects, this may include UE 215 receiving the first DL-RS and measuring the corresponding receive frequency and receiving the second DL-RS and measuring the corresponding receive frequency. In some aspects, UE 215 may estimate the first frequency offset associated with base station 205 by measuring the received frequency at which UE 215 receives the first DL-RS. Similarly, UE 215 may estimate the second frequency offset associated with base station 210 by measuring the received frequency at which UE 215 receives the second DL-RS. In this example, UE 215 may not know beforehand the DL-RS center frequency. In other examples, UE 215 may be configured with the DL-RS center frequency (e.g., via configuration signaling). In this example and based on the measured receive frequencies and the known DL-RS center frequency (e.g., as indicated in the configuration signaling), UE 215 may be able to determine the first frequency offset and the second frequency offset. This may be illustrated in Table 1 below, wherein references to the offset frequency are in absolute values, $f_{d1}$ corresponds to the first frequency offset and $f_{d2}$ corresponds to the second frequency offset.

TABLE 1

| Frequency | DL-RS (e.g., TRS) From TRP 1 | DL-RS (e.g., TRS) From TRP 2 |
|---|---|---|
| Tx (TRPs) | $F_c$ | |
| Rx (UE) | $F_c + f_{d1}$ | $F_c + f_{d2}$ |

UE 215 may transmit or otherwise convey an UL-RS using an UL-RS center frequency that is based on the first frequency offset and/or the second frequency offset (e.g., the UL-RS may include an SRS transmission using frequency $f_{SRS}$). In some aspects, the UL-RS center frequency may be selected or otherwise based on the first frequency offset associated with the first base station (e.g., base station 205) and/or the second frequency offset associated with the second base station (e.g., base station 210).

In some aspects, this may include UE 215 determining a weighted average (e.g., based on a weighting factor) of the first frequency offset and the second frequency offset. That is, UE 215 may use a weighting factor associated with the first base station and/or the second base station. For example, for a DL-RS pair (or DL-RS group where more than two SFN base stations/TRPs/RRHs are used), a weighting factor $\alpha \leq 1$ may be configured for UE 215 via configuration signaling (e.g., via higher layer signaling, RRC signaling, a MAC control element (CE), downlink control information (DCI), and the like). For example, base station 205 and/or base station 210 may transmit or otherwise convey configuration signaling to UE 215 indicating the weighting factor to be applied to a first frequency offset associated with the first base station (e.g., $F_c-f_d$, which may correspond to the measured receive frequency of the first DL-RS by UE 215) and/or a second frequency offset associated with the second base station (e.g., $F_c+f_d$, which may correspond to the measured receive frequency of the second DL-RS by UE 215). If the weighting factor is not indicated to UE 215, a default value can be configured as $\alpha=\frac{1}{2}$ and/or UE 215 may autonomously assume or select a preferred default value. Accordingly, UE 215 may identify or otherwise determine the weighting factor to be applied to the first frequency offset and/or second frequency offset. UE 215 may identify or otherwise select the UL-RS center frequency (e.g., $f_{SRS}$) based on the weighted average.

Accordingly, UE 215 may determine the transmit frequency for an SRS transmission (e.g., $f_{SRS}$) by taking a weighted average of the two frequency offset estimates. In one non-limiting example, UE 215 may use the formula $f_{SRS}=F_c+\alpha f_{d1}+(1-\alpha) f_{d1}$ to determine the UL-RS center frequency. In some aspects, the UL-RS transmission may be on a per-base station/TRP/RRH basis. This may be illustrated in Table 2 below, wherein references to the offset frequency are in absolute values, $f_{d1}$ corresponds to the first frequency offset and $f_{d2}$ corresponds to the second frequency offset.

TABLE 2

| Frequency | UL-RS (e.g., SRS) To TRP 1 | UL-RS (e.g., SRS) To TRP 2 |
|---|---|---|
| Tx (UE) | $f_{SRS}$ | |
| Rx (TRPs) | $f_{SRS} + f_{d1} = F_c + (1 + \alpha)f_{d1} + (1 - \alpha)f_{d2}$ | $f_{SRS} + f_{d2} = F_c + \alpha f_{d1} + (2 - \alpha)f_{d2}$ |

Accordingly, an SRS resource (e.g., the UL-RS resources) may be configured in association with the DL-RSs. The SRS transmission may be triggered automatically by the DL-RS and/or separately triggered in an aperiodic, semi-persistent, and/or aperiodic manner. For example, UE 215 may autonomously trigger transmission of the UL-RS using the UL-RS center frequency in response to measuring the first frequency offset and second frequency offset. Additionally, or alternatively, base station 205 and/or base station 210 may transmit or otherwise convey (and UE 215 may receive or otherwise obtain) a trigger message triggering transmission of the UL-RS using the UL-RS center frequency. In some aspects, periodic and/or semi-persistent DL-RSs and the associated SRS may be configured with the same periodicity, but with different offsets (e.g., different offsets in the time domain). In some aspects, aperiodic triggering of the DL-RSs may also trigger an aperiodic transmission of SRS. The association between the DL-RS and the SRS (e.g., UL-RS) may be configured based on a quasi-colocation (QCL) assumption, spatial relation configuration, and the like. For example, an SRS-SpatialRelationInfo information element (IE) may be extended to include two or more DL-RSs, one from each TRP. In another example, the association may be based on an UL transmission configuration indicator (TCI) state.

That is, UE 215 may utilize beamforming techniques when providing the UL-RS to the first base station and second base station. For example, UE 215 may identify a first uplink spatial filter configuration for transmitting the UL-RS(s) to the first base station. The first uplink spatial filter configuration may be based, at least in some examples, on a first downlink spatial filter configuration used for transmitting the first DL-RS. That is, UE 215 may use the downlink beamforming configuration or other spatial filter configuration associated with the first DL-RS from the first base station when selecting an uplink transmit beam for the UL-RS transmission to the first base station. Similarly, UE 215 may identify the second uplink spatial filter configuration for transmitting the UL-RS(s) to the second base station. The second uplink spatial filter configuration may be based, at least in some examples, on a second downlink spatial filter configuration used for transmitting the second DL-RS. That is, UE 215 may use the downlink beamforming configuration or other spatial filter configuration associated with the second DL-RS from the second base station when selecting an uplink transmit beam for the UL-RS transmission to the second base station. Accordingly, UE 215 may transmit the UL-RS to the first base station and/or the second base station based on the first and/or second uplink spatial filter configuration(s). As discussed above, the association between the DL-RSs and the UL-RS may be based on the first and/or second downlink spatial filter configurations, based on a downlink spatial relation information indication, a uplink and/or downlink TCI state, and the like. In some aspects, the first uplink spatial filter configuration may be associated with the first and/or second downlink spatial configurations via a spatial relation information indication and/or an uplink TCI state. In some aspects, UE 215 may use a single SRS transmission for the UL-RS using a beam/spatial filter configuration identified or otherwise selected in order to reach base station 205 and base station 215 simultaneously.

Accordingly, base station 205 and/or base station 210 may receive the UL-RS transmission (e.g., SRS transmission) from UE 215 that is based, at least in some aspects, on the first frequency offset and the second frequency offset. Accordingly, base station 205 and/or base station 210 may perform frequency offset pre-compensation determinations to identify a downlink data transmission center frequency that pre-compensates for the first frequency offset and/or the second frequency offset. For example, base station 205 and/or base station 210 may identify the difference between the received center frequency (e.g., the frequency at which the corresponding base station received the UL-RS) and the DL-RS center frequency. In some examples, base station 205 and base station 210 may coordinate with each other (e.g., when associated with the same base station) to identify or otherwise select the downlink data transmission center frequency to use for the downlink data transmission to UE 215. In other examples, base station 205 and base station 210 may not coordinate with each other (e.g., when not associated with the same base station) when identifying or otherwise selecting the downlink data transmission center frequency.

In the non-coordination pre-compensation example, this may include TRP1 (e.g., base station 205 in this example) and TRP2 (e.g., base station 210 in this example) independently or autonomously identifying otherwise selecting the downlink data transmission center frequency. For example, due to some constraints, such as delay constraints, TRP1 and TRP2 may not coordinate to derive the Doppler pre-compensation factors. Instead, each TRP may negotiate the frequency offset (relative to the carrier/Center frequency $F_c$) measured by the UL-RSs (e.g., SRS transmissions) from UE 215. In the example where the weighting factor $\alpha$ is applied (e.g., $\alpha f_{d1} + (1-\alpha)f_{d2} \cong 0$), the SRS Tx frequency $f_{SRS}$ and the demodulation reference signal (DMRS) Rx frequency $f_{DMRS}$ may be close to the true carrier/center frequency $F_c$ (e.g., $f_{SRS} \cong f_{DMRS} \cong F_c$). This may be illustrated in Table 3 below, wherein references to the offset frequency are in absolute values, $f_{d1}$ corresponds to the first frequency offset and $f_{d2}$ corresponds to the second frequency offset.

TABLE 3

| Frequency | DL Data Transmission Center Frequency (e.g., DMRS1) From TRP 1 | DL Data Transmission Center Frequency (e.g., DMRS2) From TRP 2 |
|---|---|---|
| Tx (TRPs) | $F_c + (1 + \alpha)f_{d1} - (1 - \alpha)f_{d2}$ | $F_c - \alpha f_{d1} - (2 - \alpha)f_{d2}$ |
| Rx (UE) | $f_{DMRS} = F_c - \alpha f_{d1} - (1 - \alpha)f_{d2}$ | |

In the centralized pre-compensation example, this may include TRP1 (e.g., base station 205 in this example) and TRP2 (e.g., base station 210 in this example) may coordinate in order to jointly identify or otherwise select the downlink data transmission center frequency. For example, TRP1 and TRP2 may exchange one or more wireless and/or backhaul messages to jointly derive the Doppler pre-compensation factors. In this example, the DMRS Rx frequency may be the same as the SRS Tx frequency (e.g., $f_{SRS} = f_{DMRS}$). This may be illustrated in Table 4 below, wherein references to the offset frequency are in absolute values, $f_{d1}$ corresponds to the first frequency offset and $f_{d2}$ corresponds to the second frequency offset.

TABLE 4

| Frequency | DL Data Transmission Center Frequency (e.g., DMRS1) From TRP 1 | DL Data Transmission Center Frequency (e.g., DMRS2) From TRP 2 |
|---|---|---|
| Tx (TRPs) | $F_c + (1 + \alpha)f_{d1} + (1 - \alpha)f_{d2}$ | $F_c + \alpha f_{d1} - \alpha f_{d2}$ |
| Rx (UE) | $f_{DMRS} = F_c + \alpha f_{d1} + (1 - \alpha)f_{d2}$ | |

Accordingly, for SFN data (e.g., the downlink data transmission, which may correspond to a physical downlink shared channel (PDSCH) transmission) with the frequency offset pre-compensation, the QCL assumption for the DMRS (e.g., the DL-RS transmitted in conjunction with the data) by the scheduling DCI using a TCI code point associated with two DL-RSs (e.g., the TRSs used for frequency offset measurements), an SRS resource indicator (SRI), TCI states with source SRS (e.g., a unified TCI state), and the like. For example, base station 205 and/or base station 210 (e.g., the base station scheduling the downlink data transmission) may transmit a grant scheduling the downlink data transmission. The spatial filter configuration for the DMRS transmitted in conjunction with the downlink data transmission may be based on the grant. UE 215 may identify the spatial filter configuration for the DMRS transmitted in conjunction with the downlink data transmission based on the indication carried or otherwise conveyed in the grant (e.g., the DCI grant).

Accordingly, base station 205 and/or base station 210 may transmit or otherwise provide (and UE 215 may receive or otherwise obtain) one or more subsequent downlink data transmissions using the downlink data transmission center frequency pre-compensated based on the frequency offsets. In some aspects, the downlink data transmit center frequency may be based, at least to some degree, on the received center frequency (e.g., the measured center frequency) that the corresponding base station received the UL-RS transmission from UE 215.

Figure 3:
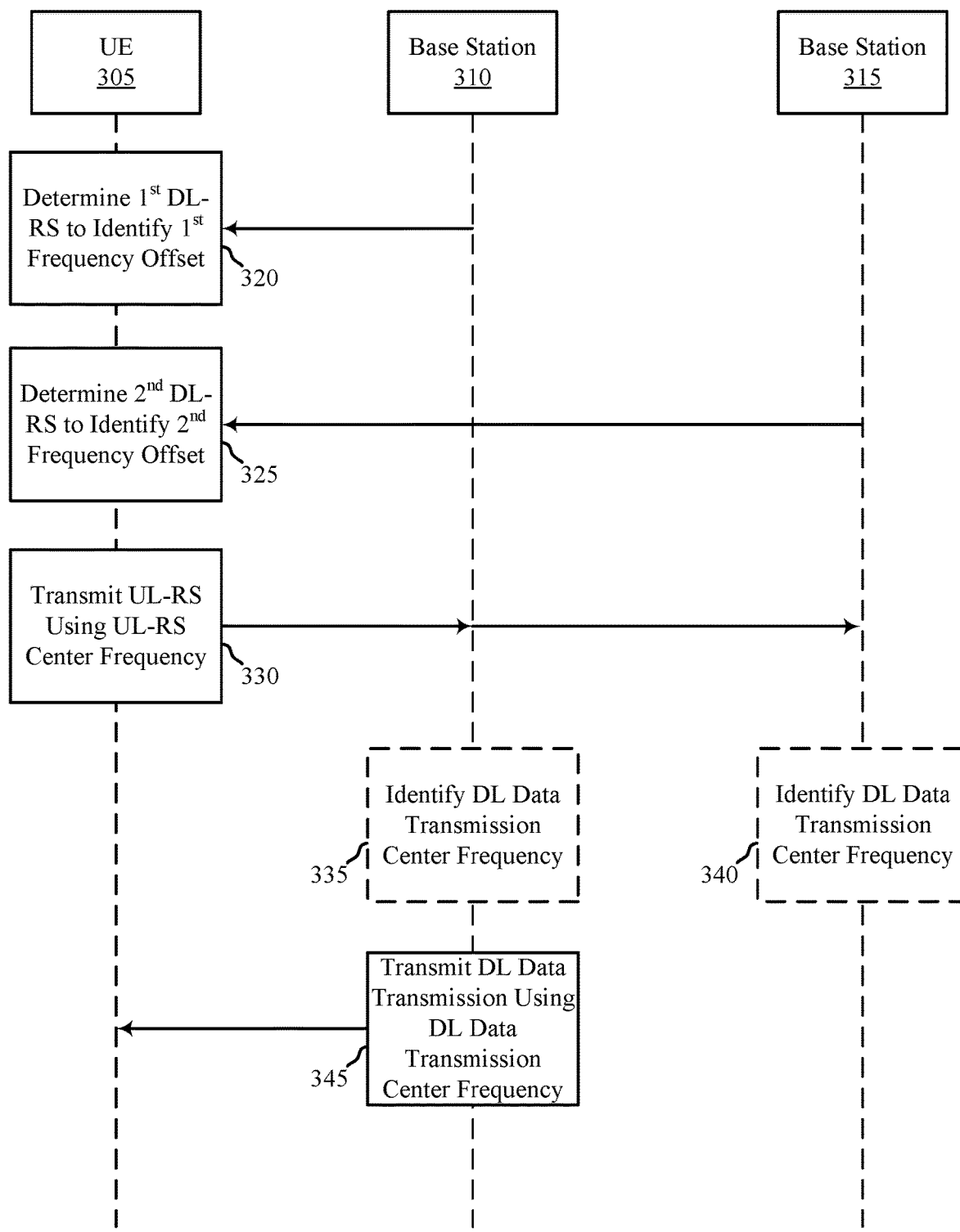
FIG. 3 illustrates an example of a process that supports uplink reference signal-based frequency offset pre-compensation in accordance with aspects of the present disclosure.

FIG. 3 illustrates an example of a process 300 that supports uplink reference signal-based frequency offset pre-compensation in accordance with aspects of the present disclosure. In some examples, process 300 may implement aspects of wireless communication systems 100 and/or 200. Aspects of process 300 may be implemented at or implemented by UE 305, base station 310, and/or base station 315, which may be examples of corresponding devices described herein. In some aspects, base station 310 may be considered a first base station and base station 315 may be considered a second base station. In some aspects, base station 310 and/or base station 315 may be examples of independent base stations, TRPs, and/or RRHs (associated with the same or with different base stations). In some aspects, base station 310 and/or base station 315 may communicate with the UE 305 using SFN techniques.

At 320, UE 305 may determine (either by estimation or measurement) the first frequency offset associated with transmissions between UE 305 and base station 310. For example, UE 305 may measure a first DL-RS (e.g., a TRS) transmitted from base station 310 using a DL-RS center frequency (e.g., Fe). This may include UE 305 measuring the received center frequency of the DL-RS (e.g., the frequency that UE 305 received the DL-RS), the receive power level, the received phase shift, and the like.

Similarly and at 325, UE 305 may determine (either by estimation or measurement) the second frequency offset associated with transmissions between UE 305 and base station 315. For example, UE 305 may measure a second DL-RS (e.g., a TRS) transmitted from base station 315 using a DL-RS center frequency (e.g., Fe). This may include UE 305 measuring the received center frequency of the DL-RS (e.g., the frequency that UE 305 received the DL-RS), the receive power level, the received phase shift, and the like.

In some aspects, UE 305 may be configured with the DL-RS center frequency. For example, base station 310 and/or base station 315 may transmit or otherwise convey a configuration signal to UE 305 identifying the DL-RS center frequency.

At 330, UE 305 may transmit or otherwise provide (and base station 310 and/or base station 315 may receive or otherwise obtain) an UL-RS using an UL-RS center frequency that is based, at least in some aspects, on the first frequency offset and/or the second frequency offset. For example, UE 305 may identify (e.g., autonomously and/or based on a configuration signal from base station 310 and/or base station 315) a weighting factor (e.g., a) to be applied to the first frequency offset and/or the second frequency offset. UE 305 may identify, determine, or otherwise select the UL-RS center frequency based on the first frequency offset, the second frequency offset, and/or the weighting factor.

In some aspects, UE 305 may autonomously transmit the UL-RS using the UL-RS center frequency in response to measuring the first frequency offset and the second frequency offset. Additionally, or alternatively, UE 305 may receive a trigger message triggering transmission of the UL-RS using the UL-RS center frequency (e.g., $f_{SRS}$). In some aspects, this may include UE 305 identifying or otherwise determining a weighted average of the first frequency offset and/or second frequency offset. UE 305 may identify or otherwise select the UL-RS center frequency based on the weighted average (e.g., using the weighting factor, a). In some aspects, base station 310 and/or base station 315 may transmit or otherwise provide (and UE 305 may receive or otherwise obtain) a configuration signal indicating a weighting factor to be applied to the first frequency offset and/or the second frequency offset. As discussed, the UL-RS center frequency may be based on the first frequency offset, the second frequency offset, and the weighting factor.

In some aspects, the DL-RS and corresponding UL-RS may be beamformed transmissions. For example, the first DL-RS may have a corresponding first downlink spatial filter configuration and the second DL-RS may have a corresponding second downlink spatial filter configuration. Accordingly, UE 305 may identify or otherwise select a first uplink spatial filter configuration for transmitting the UL-RS(s) to base station 310 and to base station 315. UE 305 may transmit the UL-RS(s) to the first base station (e.g., base station 310) and/or the second base station (e.g., base station 315) based on the first uplink spatial filter configuration. As discussed, an association between the DL-RS and UL-RS may be based on the spatial filter configurations, a downlink spatial relation information indication, an uplink TCI state, and the like.

At 335, base station 310 may optionally identify a downlink data transmission center frequency based on the received frequency at which base station 310 received the UL-RS transmitted from UE 305 at 330. For example, base station 310 may identify a difference between the received center frequency and the DL-RS center frequency (e.g., Fe). Base station 310 identify or otherwise select the downlink data transmission center frequency for a corresponding downlink data transmission to UE 305 based on the difference.

Similarly and at 340, base station 315 may optionally identify a downlink data transmission center frequency based on the received frequency at which base station 315 received the UL-RS transmitted from UE 305 at 330. For example, base station 315 may identify a difference between the received center frequency and the DL-RS center frequency (e.g., Fe). Base station 315 identify or otherwise select the downlink data transmission center frequency for a corresponding downlink data transmission to UE 305 based on the difference.

In some aspects, base station 310 and base station 315 may coordinate with each other to identify the downlink data transmission center frequency to use for the downlink data transmission to UE 305. In other aspects, base station 310 and base station 315 may separately identify the downlink data transmission center frequency.

At 345, base station 310 may transmit or otherwise provide (and UE 305 may receive or otherwise obtain) a downlink data transmission at a receive center frequency that is based, at least in some aspects, on the UL-RS center frequency. Although process 300 shows the downlink data transmission being performed by base station 310, it is to be understood that base station 315 may implement aspects of the described techniques when performing the downlink data transmission to UE 305.

In some aspects, this may include base station 310 transmitting or otherwise providing (and UE 305 receiving or otherwise obtaining) a grant scheduling the downlink data transmission. UE 305 may identify a spatial filter configuration for the DMRS transmitted in conjunction with the downlink data transmission based on the grant.

Figure 4:
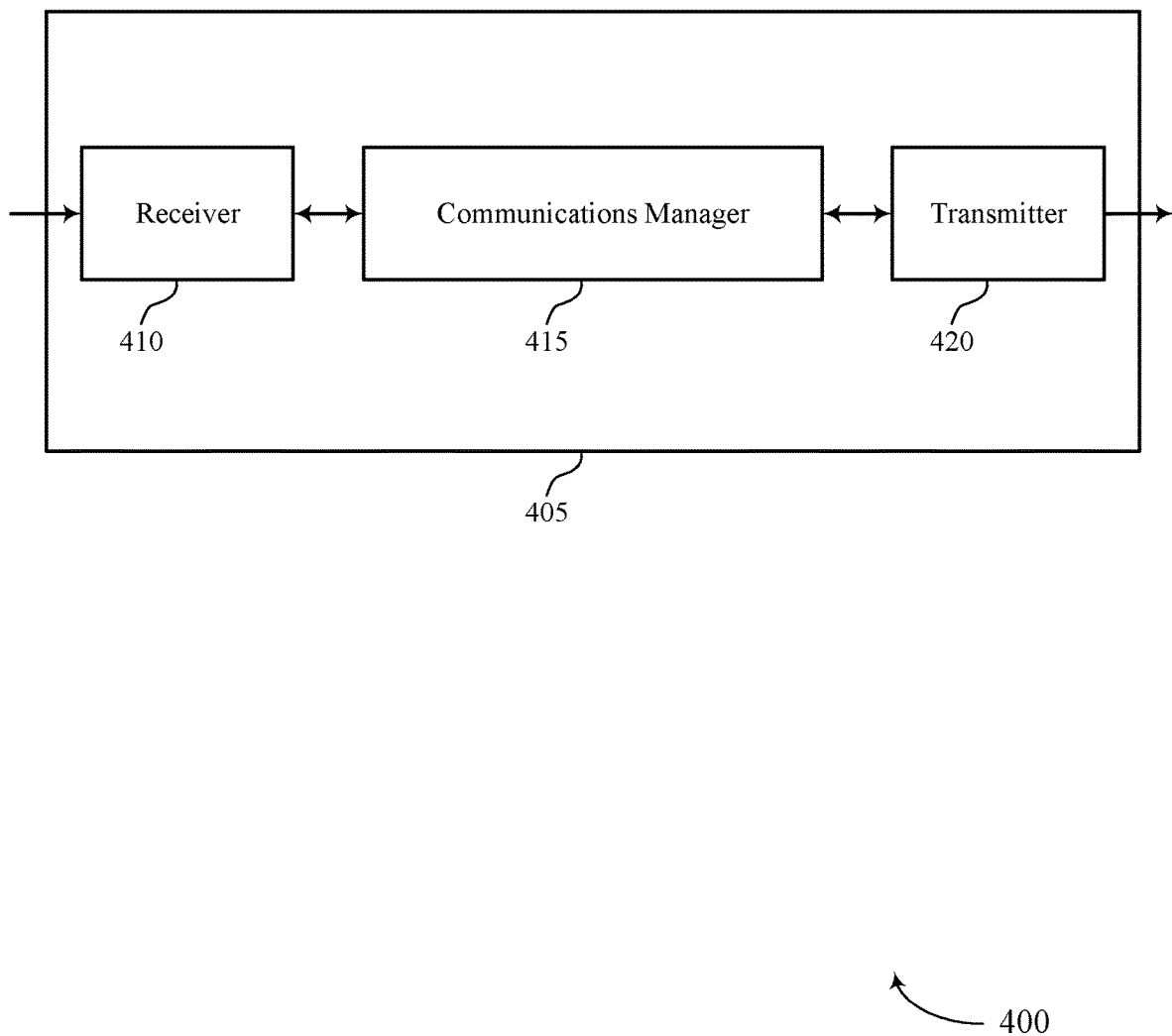
FIGS. 4 and 5 show block diagrams of devices that support uplink reference signal-based frequency offset pre-compensation in accordance with aspects of the present disclosure.

FIG. 4 shows a block diagram 400 of a device 405 that supports uplink reference signal-based frequency offset pre-compensation in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to uplink reference signal-based frequency offset pre-compensation, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine, based on a first downlink reference signal transmitted from a first base station using a downlink reference signal frequency, a first frequency offset associated with transmissions between the UE and the first base station, determine, based on a second downlink reference signal transmitted from a second base station using the downlink reference signal frequency, a second frequency offset associated with transmissions between the UE and the second base station, transmit, to the first base station and the second base station, at least one uplink reference signal using an uplink reference signal frequency that is based on the first frequency offset and the second frequency offset, and receive a downlink data transmission from the first base station or the second base station at a receive frequency that is based on the uplink reference signal frequency. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
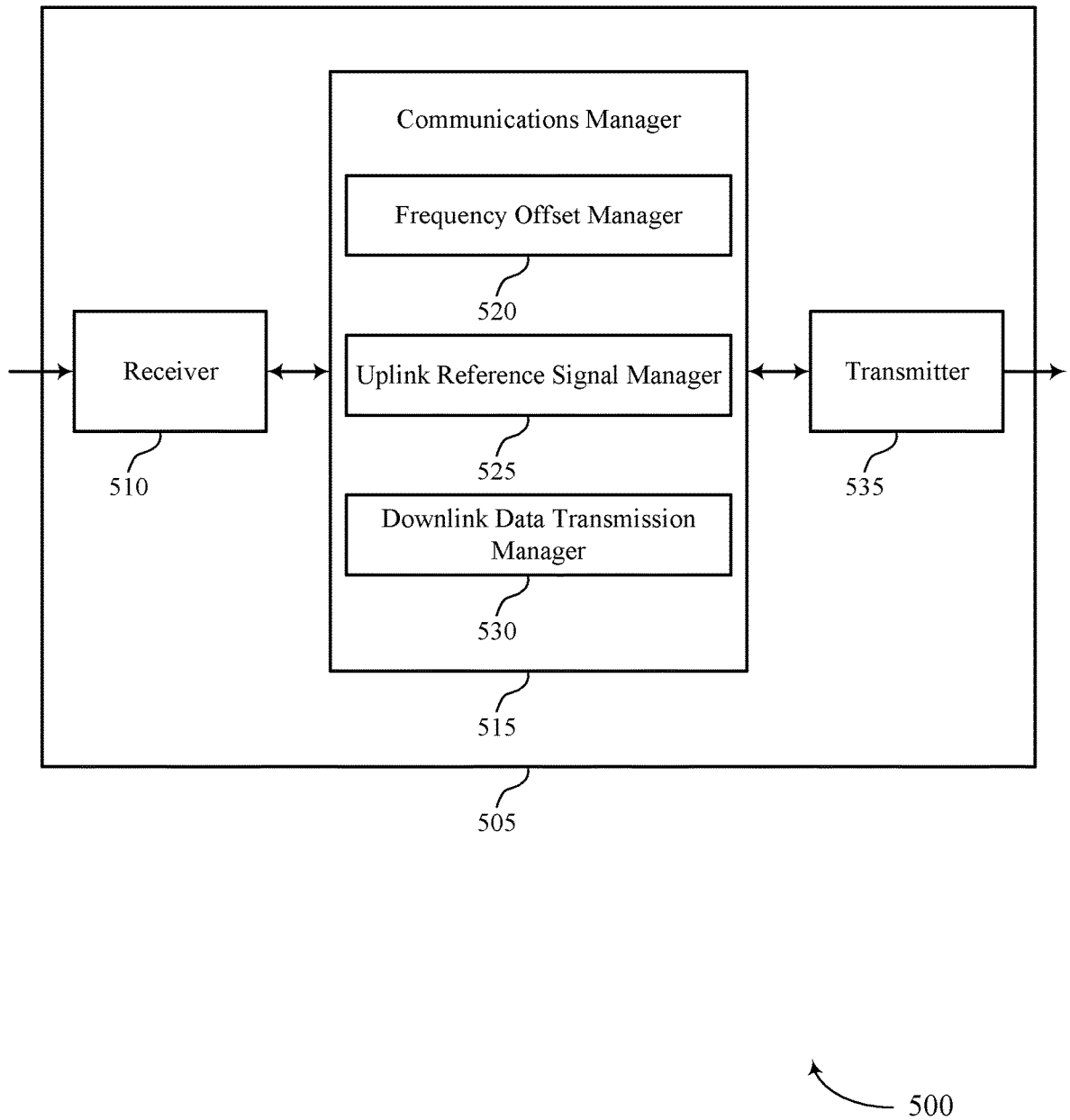

FIG. 5 shows a block diagram 500 of a device 505 that supports uplink reference signal-based frequency offset pre-compensation in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to uplink reference signal-based frequency offset pre-compensation, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a frequency offset manager 520, an uplink reference signal manager 525, and a downlink data transmission manager 530. The communications manager 515 may be an example of aspects of the communications manager 710 described herein.

The frequency offset manager 520 may determine, based on a first downlink reference signal transmitted from a first base station using a downlink reference signal frequency, a first frequency offset associated with transmissions between the UE and the first base station and determine, based on a second downlink reference signal transmitted from a second base station using the downlink reference signal frequency, a second frequency offset associated with transmissions between the UE and the second base station.

The uplink reference signal manager 525 may transmit, to the first base station and the second base station, at least one uplink reference signal using an uplink reference signal frequency that is based on the first frequency offset and the second frequency offset.

The downlink data transmission manager 530 may receive a downlink data transmission from the first base station or the second base station at a receive frequency that is based on the uplink reference signal frequency.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
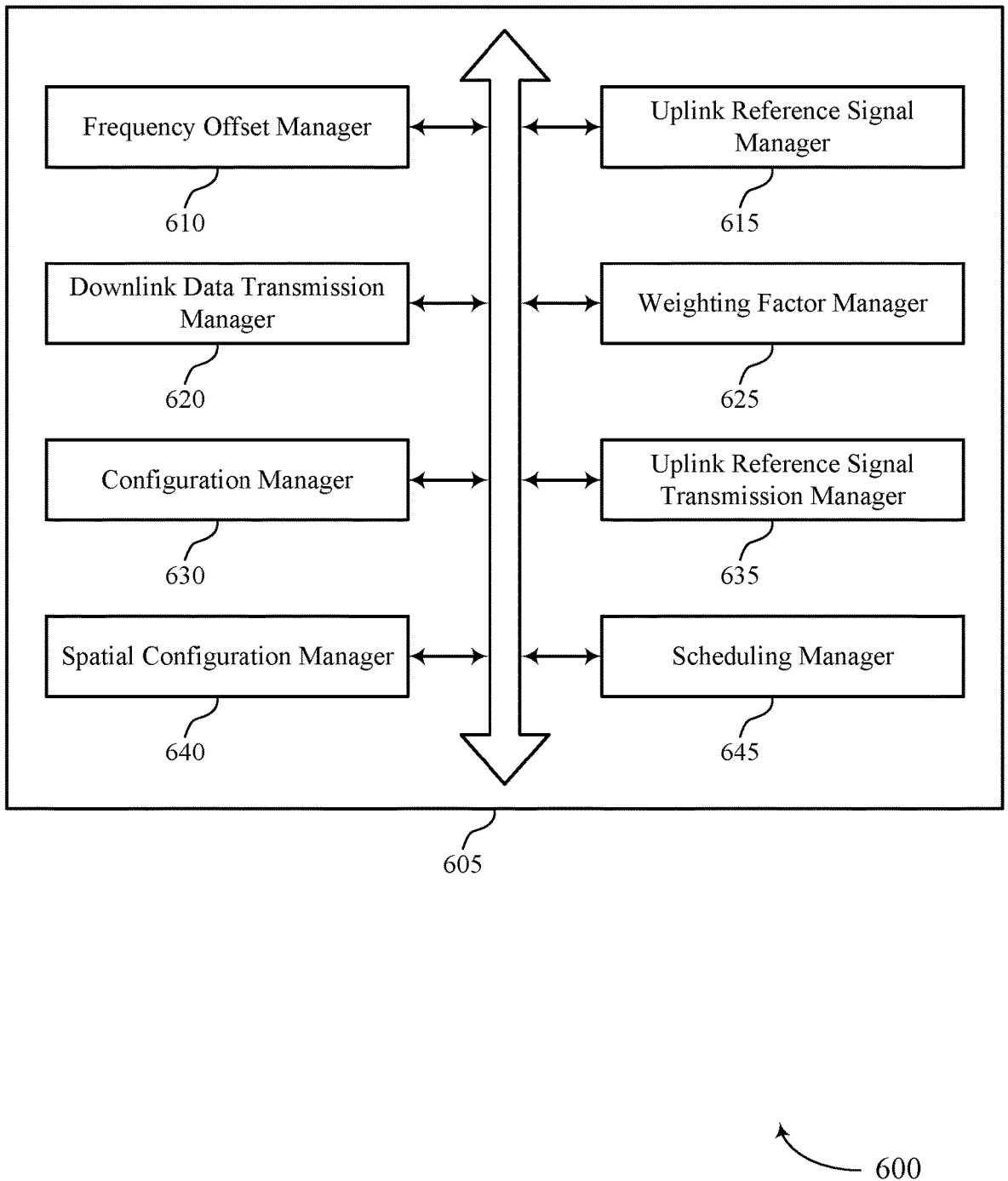
FIG. 6 shows a block diagram of a communications manager that supports uplink reference signal-based frequency offset pre-compensation in accordance with aspects of the present disclosure.

FIG. 6 shows a block diagram 600 of a communications manager 605 that supports uplink reference signal-based frequency offset pre-compensation in accordance with aspects of the present disclosure. The communications manager 605 may be an example of aspects of a communications manager 415, a communications manager 515, or a communications manager 710 described herein. The communications manager 605 may include a frequency offset manager 610, an uplink reference signal manager 615, a downlink data transmission manager 620, a weighting factor manager 625, a configuration manager 630, an uplink reference signal transmission manager 635, a spatial configuration manager 640, and a scheduling manager 645. Each of these modules may communicate, directly or indirectly, with one another (e.g., via one or more buses).

The frequency offset manager 610 may determine, based on a first downlink reference signal transmitted from a first base station using a downlink reference signal frequency, a first frequency offset associated with transmissions between the UE and the first base station. In some examples, the frequency offset manager 610 may determine, based on a second downlink reference signal transmitted from a second base station using the downlink reference signal frequency, a second frequency offset associated with transmissions between the UE and the second base station.

The uplink reference signal manager 615 may transmit, to the first base station and the second base station, at least one uplink reference signal using an uplink reference signal frequency that is based on the first frequency offset and the second frequency offset.

The downlink data transmission manager 620 may receive a downlink data transmission from the first base station or the second base station at a receive frequency that is based on the uplink reference signal frequency.

The weighting factor manager 625 may identify a weighting factor to be applied to the first frequency offset, the second frequency offset, or both. In some examples, the weighting factor manager 625 may determine the uplink reference signal frequency based on the first frequency offset, the second frequency offset, and the weighting factor. In some examples, the weighting factor manager 625 may receive a configuration signal indicating the weighting factor. In some examples, the weighting factor manager 625 may determine a weighted average of the first frequency offset and the second frequency offset. In some examples, the weighting factor manager 625 may identify the uplink reference signal frequency based on the weighted average.

The configuration manager 630 may receive a configuration signal identifying the downlink reference signal frequency.

The uplink reference signal transmission manager 635 may transmit, autonomously by the UE, the uplink reference signal using the uplink reference signal frequency in response to measuring the first frequency offset and the second frequency offset. In some examples, the uplink reference signal transmission manager 635 may receive a trigger message triggering transmission of the uplink reference signal using the uplink reference signal frequency.

The spatial configuration manager 640 may identify a first uplink spatial filter configuration for transmitting the at least one uplink reference signal t based on a first downlink spatial filter configuration associated with the first downlink reference signal and a second downlink spatial filter configuration associated with the second downlink reference signal. In some examples, the spatial configuration manager 640 may transmit the uplink reference signal to the first base station and to the second base station based on the first uplink spatial filter configuration. In some cases, the first downlink spatial filter configuration, the second downlink spatial filter configuration, or both, are identified based on a downlink TCI state. In some cases, the first uplink spatial filter configuration may be associated with the first and/or second downlink spatial filter configurations based on a spatial relation information indication and/or an uplink TCI state.

The scheduling manager 645 may receive a grant scheduling the downlink data transmission. In some examples, the scheduling manager 645 may identify a spatial filter configuration for a demodulation reference signal transmitted in conjunction with the downlink data transmission based on the grant.

Figure 7:
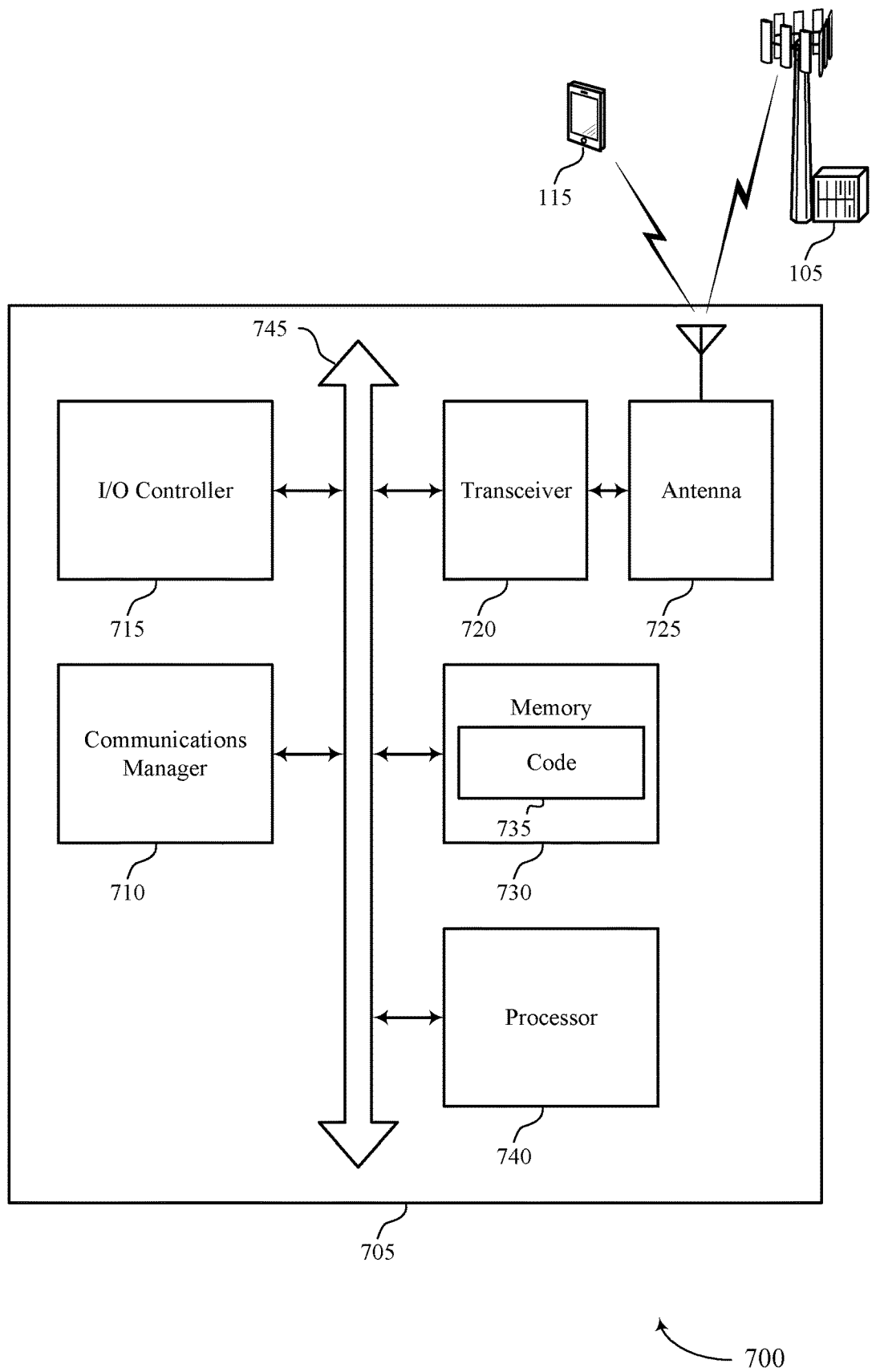
FIG. 7 shows a diagram of a system including a device that supports uplink reference signal-based frequency offset pre-compensation in accordance with aspects of the present disclosure.

FIG. 7 shows a diagram of a system 700 including a device 705 that supports uplink reference signal-based frequency offset pre-compensation in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine, based on a first downlink reference signal transmitted from a first base station using a downlink reference signal frequency, a first frequency offset associated with transmissions between the UE and the first base station, determine, based on a second downlink reference signal transmitted from a second base station using the downlink reference signal frequency, a second frequency offset associated with transmissions between the UE and the second base station, transmit, to the first base station and the second base station, at least one uplink reference signal using an uplink reference signal frequency that is based on the first frequency offset and the second frequency offset, and receive a downlink data transmission from the first base station or the second base station at a receive frequency that is based on the uplink reference signal frequency.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting uplink reference signal-based frequency offset pre-compensation).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
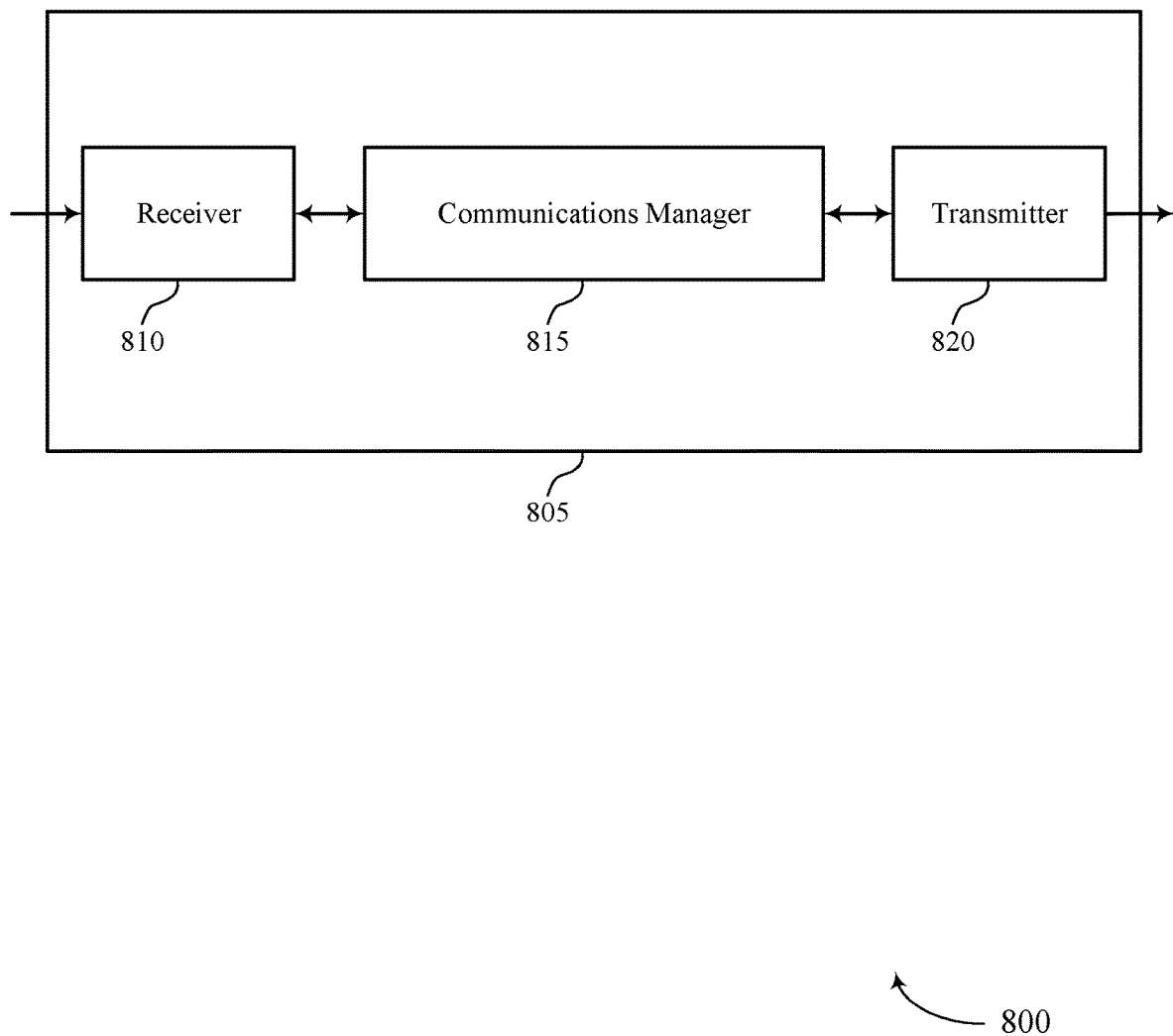
FIGS. 8 and 9 show block diagrams of devices that support uplink reference signal-based frequency offset pre-compensation in accordance with aspects of the present disclosure.

FIG. 8 shows a block diagram 800 of a device 805 that supports uplink reference signal-based frequency offset pre-compensation in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink reference signal-based frequency offset pre-compensation, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a UE, a first downlink reference signal using a downlink reference signal frequency, receive, from the UE, at least one uplink reference signal using an uplink reference signal frequency that is based on a first frequency offset associated with transmissions between the UE and the first base station and a second frequency offset associated with transmissions between the UE and a second base station, and transmit a downlink data transmission to the UE at a receive frequency for the UE that is based on the uplink reference signal frequency. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
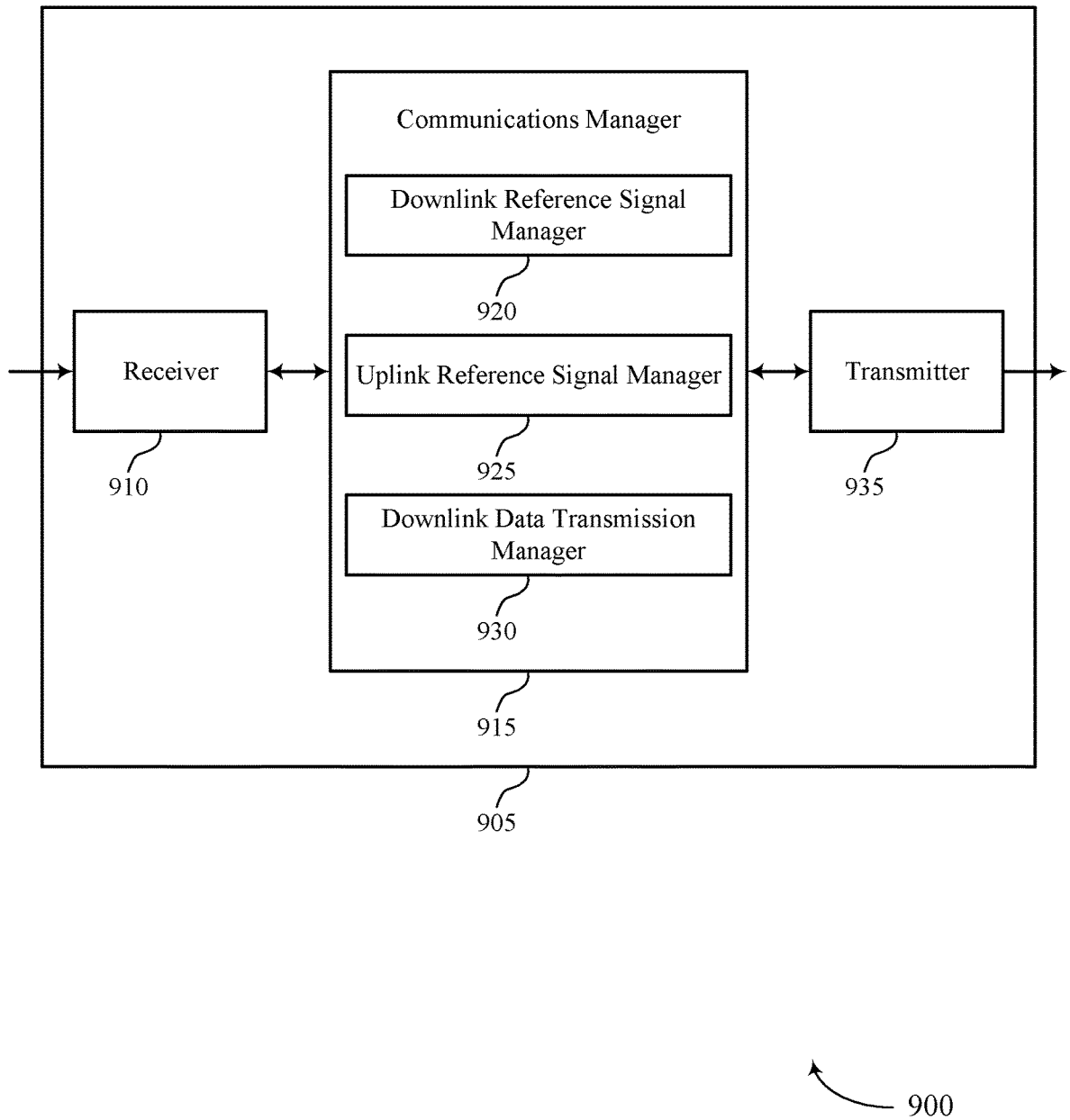

FIG. 9 shows a block diagram 900 of a device 905 that supports uplink reference signal-based frequency offset pre-compensation in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to uplink reference signal-based frequency offset pre-compensation, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a downlink reference signal manager 920, an uplink reference signal manager 925, and a downlink data transmission manager 930. The communications manager 915 may be an example of aspects of the communications manager 1110 described herein.

The downlink reference signal manager 920 may transmit, to a UE, a first downlink reference signal using a downlink reference signal frequency.

The uplink reference signal manager 925 may receive, from the UE, at least one uplink reference signal using an uplink reference signal frequency that is based on a first frequency offset associated with transmissions between the UE and the first base station and a second frequency offset associated with transmissions between the UE and a second base station.

The downlink data transmission manager 930 may transmit a downlink data transmission to the UE at a receive frequency for the UE that is based on the uplink reference signal frequency.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
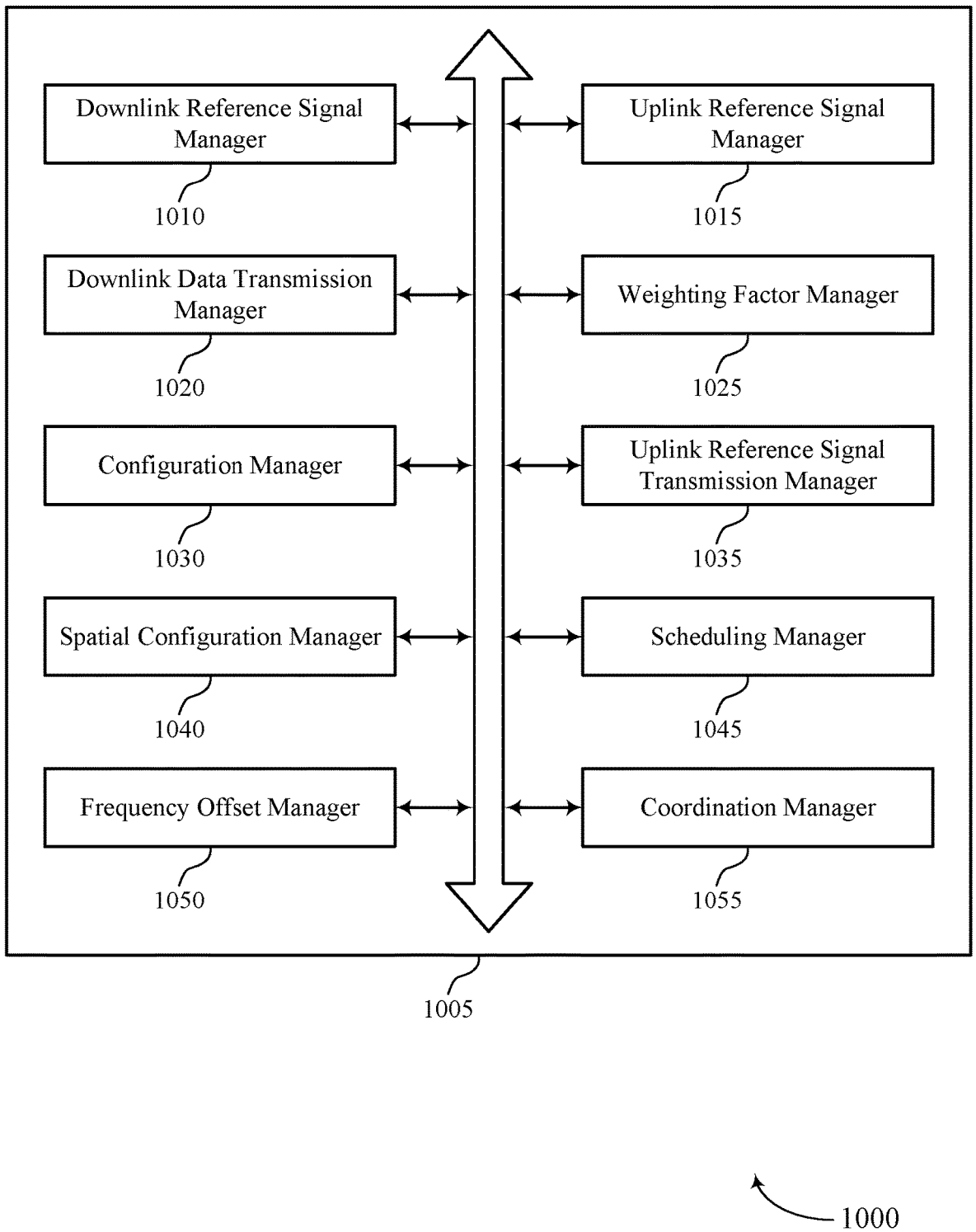
FIG. 10 shows a block diagram of a communications manager that supports uplink reference signal-based frequency offset pre-compensation in accordance with aspects of the present disclosure.

FIG. 10 shows a block diagram 1000 of a communications manager 1005 that supports uplink reference signal-based frequency offset pre-compensation in accordance with aspects of the present disclosure. The communications manager 1005 may be an example of aspects of a communications manager 815, a communications manager 915, or a communications manager 1110 described herein. The communications manager 1005 may include a downlink reference signal manager 1010, an uplink reference signal manager 1015, a downlink data transmission manager 1020, a weighting factor manager 1025, a configuration manager 1030, an uplink reference signal transmission manager 1035, a spatial configuration manager 1040, a scheduling manager 1045, a frequency offset manager 1050, and a coordination manager 1055. Each of these modules may communicate, directly or indirectly, with one another (e.g., via one or more buses).

The downlink reference signal manager 1010 may transmit, to a UE, a first downlink reference signal using a downlink reference signal frequency.

The uplink reference signal manager 1015 may receive, from the UE, at least one uplink reference signal using an uplink reference signal frequency that is based on a first frequency offset associated with transmissions between the UE and the first base station and a second frequency offset associated with transmissions between the UE and a second base station. In some cases, the UE autonomously transmits the uplink reference signal using the uplink reference signal frequency in response to the UE determining the first frequency offset and the second frequency offset.

The downlink data transmission manager 1020 may transmit a downlink data transmission to the UE at a receive frequency for the UE that is based on the uplink reference signal frequency.

The weighting factor manager 1025 may transmit, to the UE, a configuration signal indicating a weighting factor to be applied to the first frequency offset, the second frequency offset, or both, where the UE determines the uplink reference signal frequency based on the first frequency offset, the second frequency offset, and the weighting factor. In some examples, the weighting factor manager 1025 may identify the receive frequency based on a weighted average of the first frequency offset and the second frequency offset, where the receive frequency is based on the weighted average.

The configuration manager 1030 may transmit a configuration signal identifying the downlink reference signal frequency. The uplink reference signal transmission manager 1035 may transmit, to the UE, a trigger message triggering transmission of the uplink reference signal using the uplink reference signal frequency.

The spatial configuration manager 1040 may receive the uplink reference signal from the UE based on a first uplink spatial filter configuration, where the first uplink spatial filter configuration for receiving the uplink reference signal from the UE is based on a first downlink spatial filter configuration associated with the first downlink reference signal. In some examples, the spatial configuration manager 1040 may transmit an indication of a downlink spatial relation information indication, an uplink TCI, or both, where the first downlink spatial filter configuration is based on the indication.

The scheduling manager 1045 may receive a grant scheduling the downlink data transmission, where a spatial filter configuration for a demodulation reference signal transmitted in conjunction with the downlink data transmission based on the grant.

The frequency offset manager 1050 may identify a difference between the uplink reference signal frequency and the downlink reference signal frequency. In some examples, the frequency offset manager 1050 may identify the receive frequency for the downlink data transmission to the UE based on the difference.

The coordination manager 1055 may coordinate with the second base station to identify the receive frequency to use for the downlink data transmission to the UE.

Figure 11:
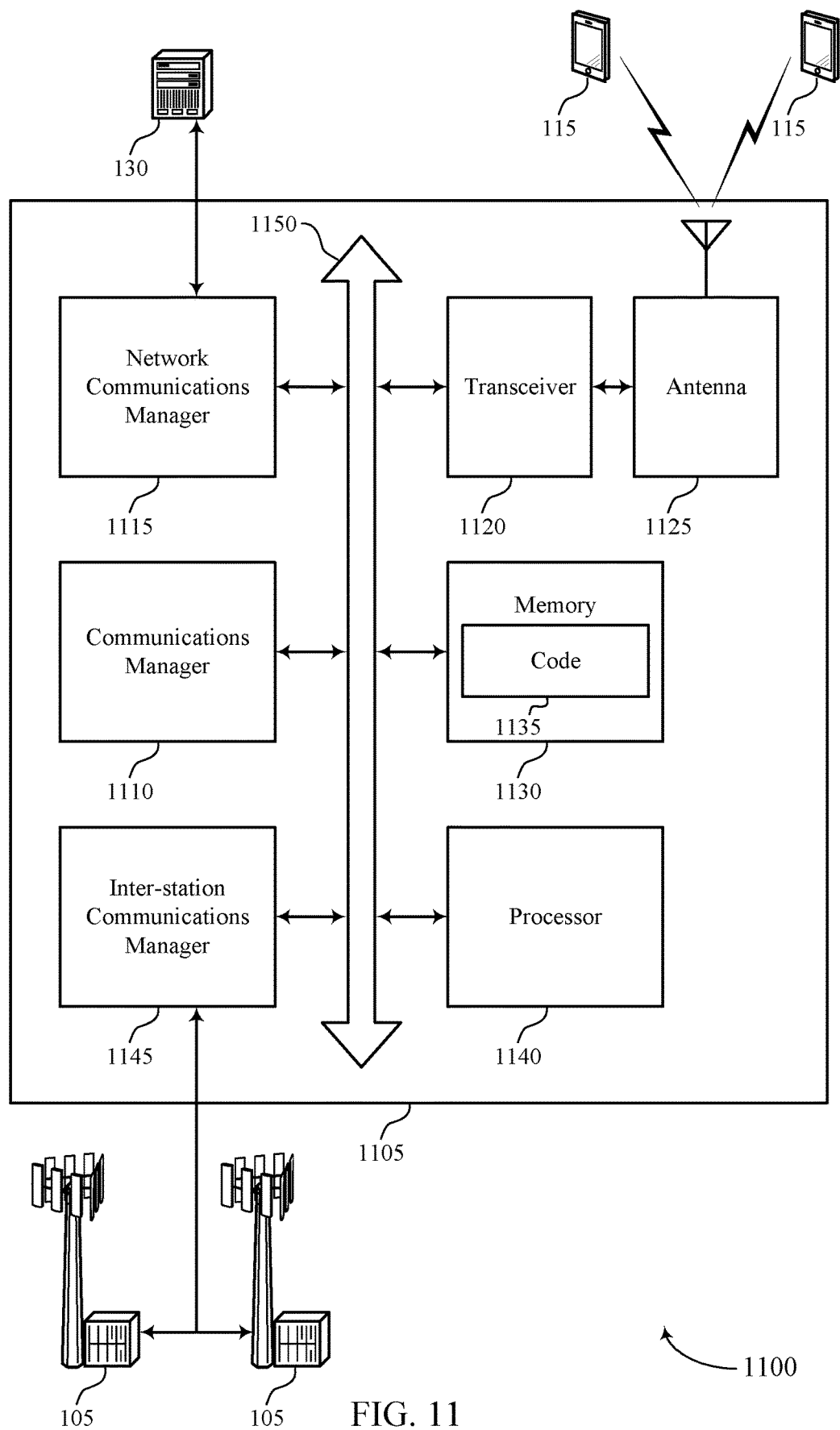
FIG. 11 shows a diagram of a system including a device that supports uplink reference signal-based frequency offset pre-compensation in accordance with aspects of the present disclosure.

FIG. 11 shows a diagram of a system 1100 including a device 1105 that supports uplink reference signal-based frequency offset pre-compensation in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a UE, a first downlink reference signal using a downlink reference signal frequency, receive, from the UE, at least one uplink reference signal using an uplink reference signal frequency that is based on a first frequency offset associated with transmissions between the UE and the first base station and a second frequency offset associated with transmissions between the UE and a second base station, and transmit a downlink data transmission to the UE at a receive frequency for the UE that is based on the uplink reference signal frequency.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting uplink reference signal-based frequency offset pre-compensation).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
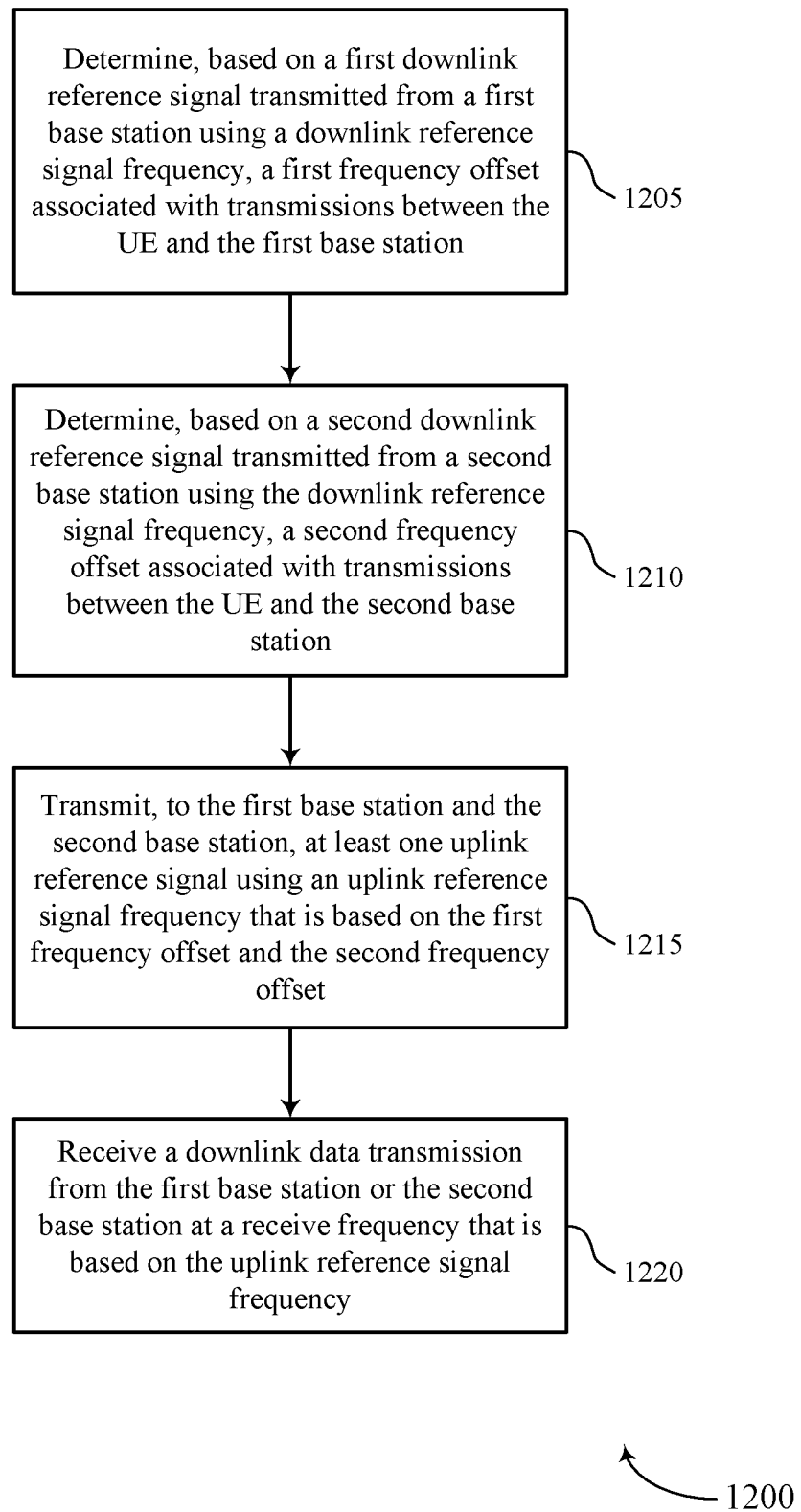
FIGS. 12 through 16 show flowcharts illustrating methods that support uplink reference signal-based frequency offset pre-compensation in accordance with aspects of the present disclosure.

FIG. 12 shows a flowchart illustrating a method 1200 that supports uplink reference signal-based frequency offset pre-compensation in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1205, the UE may determine, based on a first downlink reference signal transmitted from a first base station using a downlink reference signal frequency, a first frequency offset associated with transmissions between the UE and the first base station. The operations of 1205 may be performed according to the methods described herein. In some examples, aspects of the operations of 1205 may be performed by a frequency offset manager as described with reference to FIGS. 4 through 7.

At 1210, the UE may determine, based on a second downlink reference signal transmitted from a second base station using the downlink reference signal frequency, a second frequency offset associated with transmissions between the UE and the second base station. The operations of 1210 may be performed according to the methods described herein. In some examples, aspects of the operations of 1210 may be performed by a frequency offset manager as described with reference to FIGS. 4 through 7.

At 1215, the UE may transmit, to the first base station and the second base station, at least one uplink reference signal using an uplink reference signal frequency that is based on the first frequency offset and the second frequency offset. The operations of 1215 may be performed according to the methods described herein. In some examples, aspects of the operations of 1215 may be performed by an uplink reference signal manager as described with reference to FIGS. 4 through 7.

At 1220, the UE may receive a downlink data transmission from the first base station or the second base station at a receive frequency that is based on the uplink reference signal frequency. The operations of 1220 may be performed according to the methods described herein. In some examples, aspects of the operations of 1220 may be performed by a downlink data transmission manager as described with reference to FIGS. 4 through 7.

Figure 13:
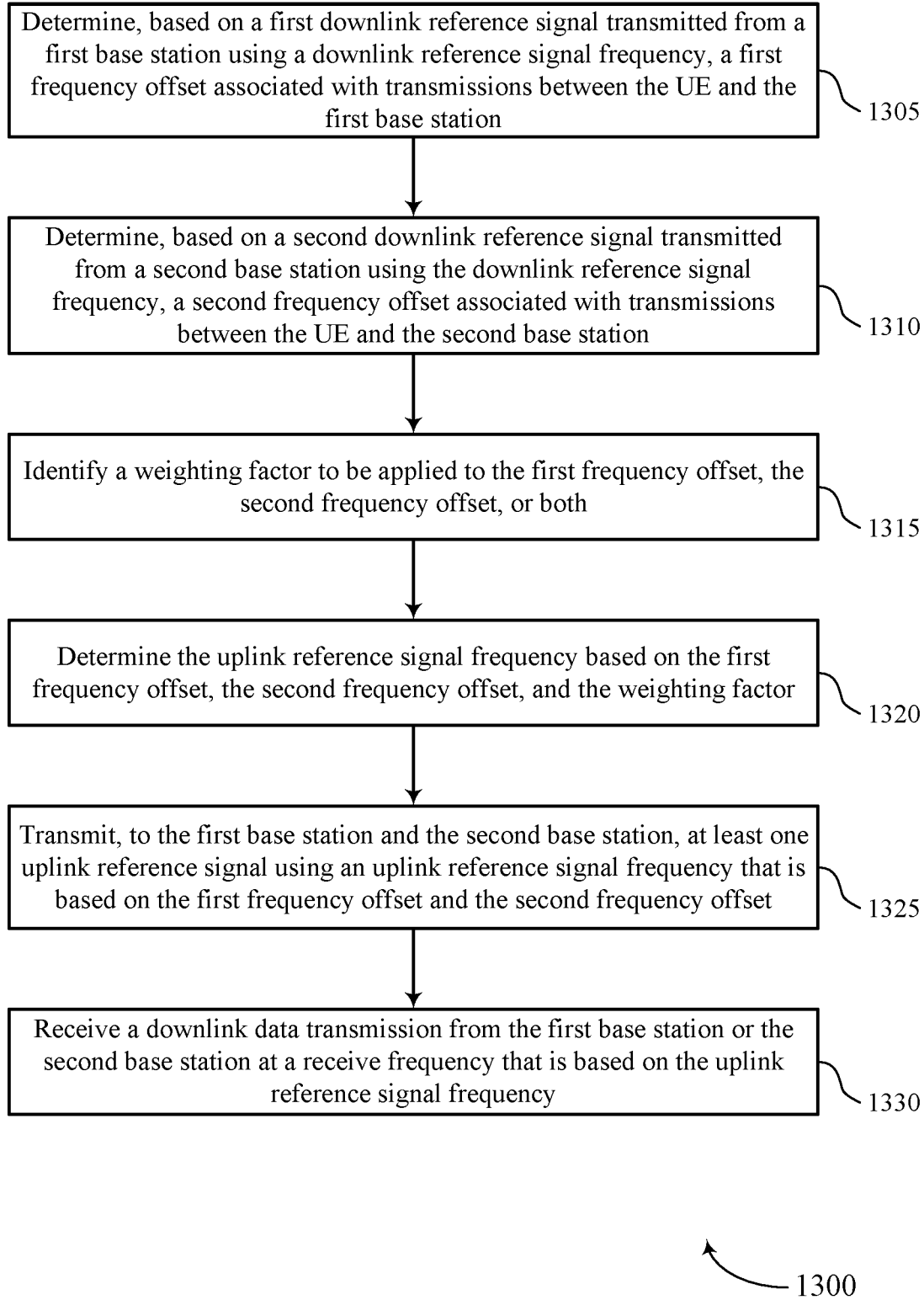

FIG. 13 shows a flowchart illustrating a method 1300 that supports uplink reference signal-based frequency offset pre-compensation in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1305, the UE may determine, based on a first downlink reference signal transmitted from a first base station using a downlink reference signal frequency, a first frequency offset associated with transmissions between the UE and the first base station. The operations of 1305 may be performed according to the methods described herein. In some examples, aspects of the operations of 1305 may be performed by a frequency offset manager as described with reference to FIGS. 4 through 7.

At 1310, the UE may determine, based on a second downlink reference signal transmitted from a second base station using the downlink reference signal frequency, a second frequency offset associated with transmissions between the UE and the second base station. The operations of 1310 may be performed according to the methods described herein. In some examples, aspects of the operations of 1310 may be performed by a frequency offset manager as described with reference to FIGS. 4 through 7.

At 1315, the UE may identify a weighting factor to be applied to the first frequency offset, the second frequency offset, or both. The operations of 1315 may be performed according to the methods described herein. In some examples, aspects of the operations of 1315 may be performed by a weighting factor manager as described with reference to FIGS. 4 through 7.

At 1320, the UE may determine the uplink reference signal frequency based on the first frequency offset, the second frequency offset, and the weighting factor. The operations of 1320 may be performed according to the methods described herein. In some examples, aspects of the operations of 1320 may be performed by a weighting factor manager as described with reference to FIGS. 4 through 7.

At 1325, the UE may transmit, to the first base station and the second base station, at least one uplink reference signal using an uplink reference signal frequency that is based on the first frequency offset and the second frequency offset. The operations of 1325 may be performed according to the methods described herein. In some examples, aspects of the operations of 1325 may be performed by an uplink reference signal manager as described with reference to FIGS. 4 through 7.

At 1330, the UE may receive a downlink data transmission from the first base station or the second base station at a receive frequency that is based on the uplink reference signal frequency. The operations of 1330 may be performed according to the methods described herein. In some examples, aspects of the operations of 1330 may be performed by a downlink data transmission manager as described with reference to FIGS. 4 through 7.

Figure 14:
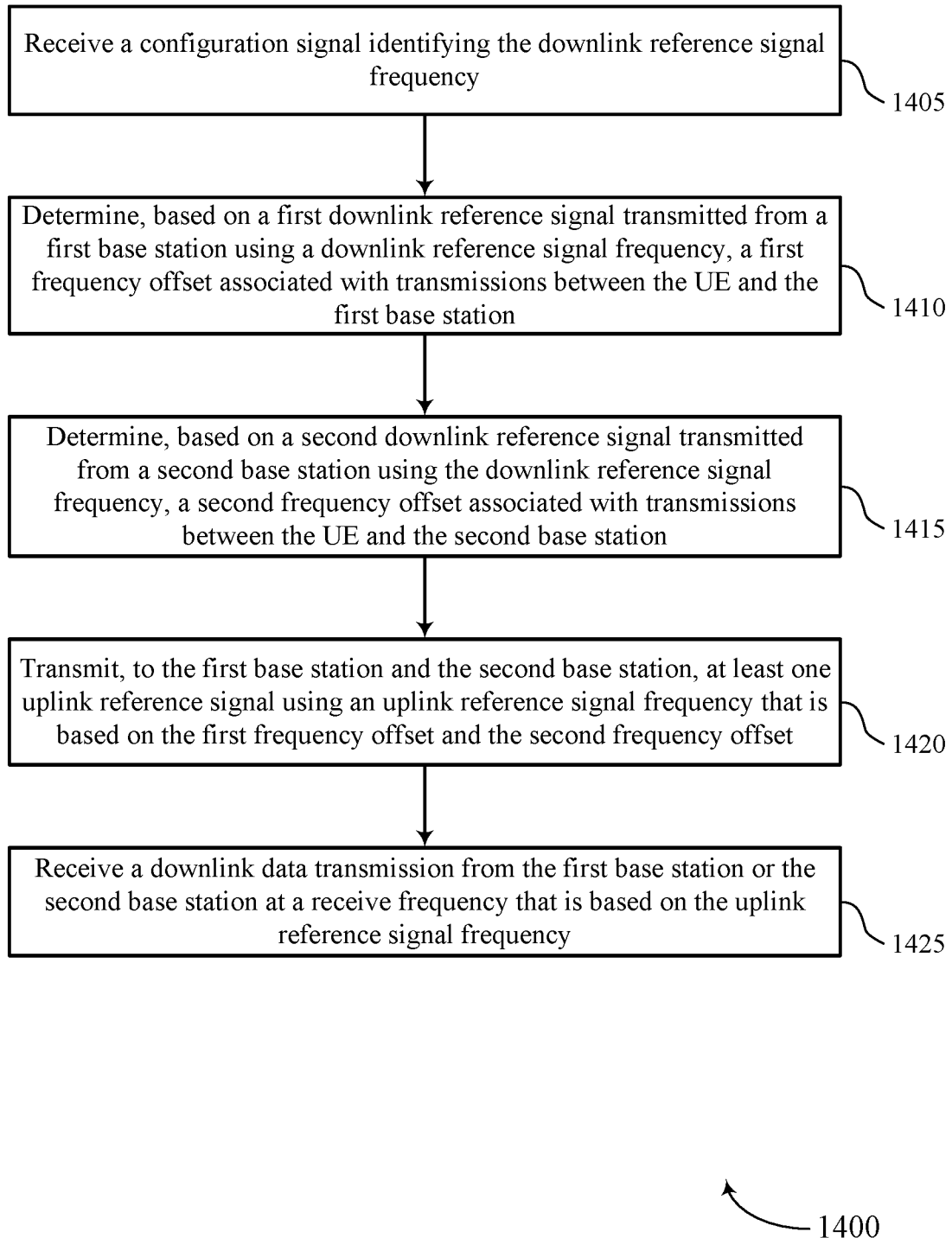

FIG. 14 shows a flowchart illustrating a method 1400 that supports uplink reference signal-based frequency offset pre-compensation in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1405, the UE may receive a configuration signal identifying the downlink reference signal frequency. The operations of 1405 may be performed according to the methods described herein. In some examples, aspects of the operations of 1405 may be performed by a configuration manager as described with reference to FIGS. 4 through 7.

At 1410, the UE may determine, based on a first downlink reference signal transmitted from a first base station using a downlink reference signal frequency, a first frequency offset associated with transmissions between the UE and the first base station. The operations of 1410 may be performed according to the methods described herein. In some examples, aspects of the operations of 1410 may be performed by a frequency offset manager as described with reference to FIGS. 4 through 7.

At 1415, the UE may determine, based on a second downlink reference signal transmitted from a second base station using the downlink reference signal frequency, a second frequency offset associated with transmissions between the UE and the second base station. The operations of 1415 may be performed according to the methods described herein. In some examples, aspects of the operations of 1415 may be performed by a frequency offset manager as described with reference to FIGS. 4 through 7.

At 1420, the UE may transmit, to the first base station and the second base station, at least one uplink reference signal using an uplink reference signal frequency that is based on the first frequency offset and the second frequency offset. The operations of 1420 may be performed according to the methods described herein. In some examples, aspects of the operations of 1420 may be performed by an uplink reference signal manager as described with reference to FIGS. 4 through 7.

At 1425, the UE may receive a downlink data transmission from the first base station or the second base station at a receive frequency that is based on the uplink reference signal frequency. The operations of 1425 may be performed according to the methods described herein. In some examples, aspects of the operations of 1425 may be performed by a downlink data transmission manager as described with reference to FIGS. 4 through 7.

Figure 15:
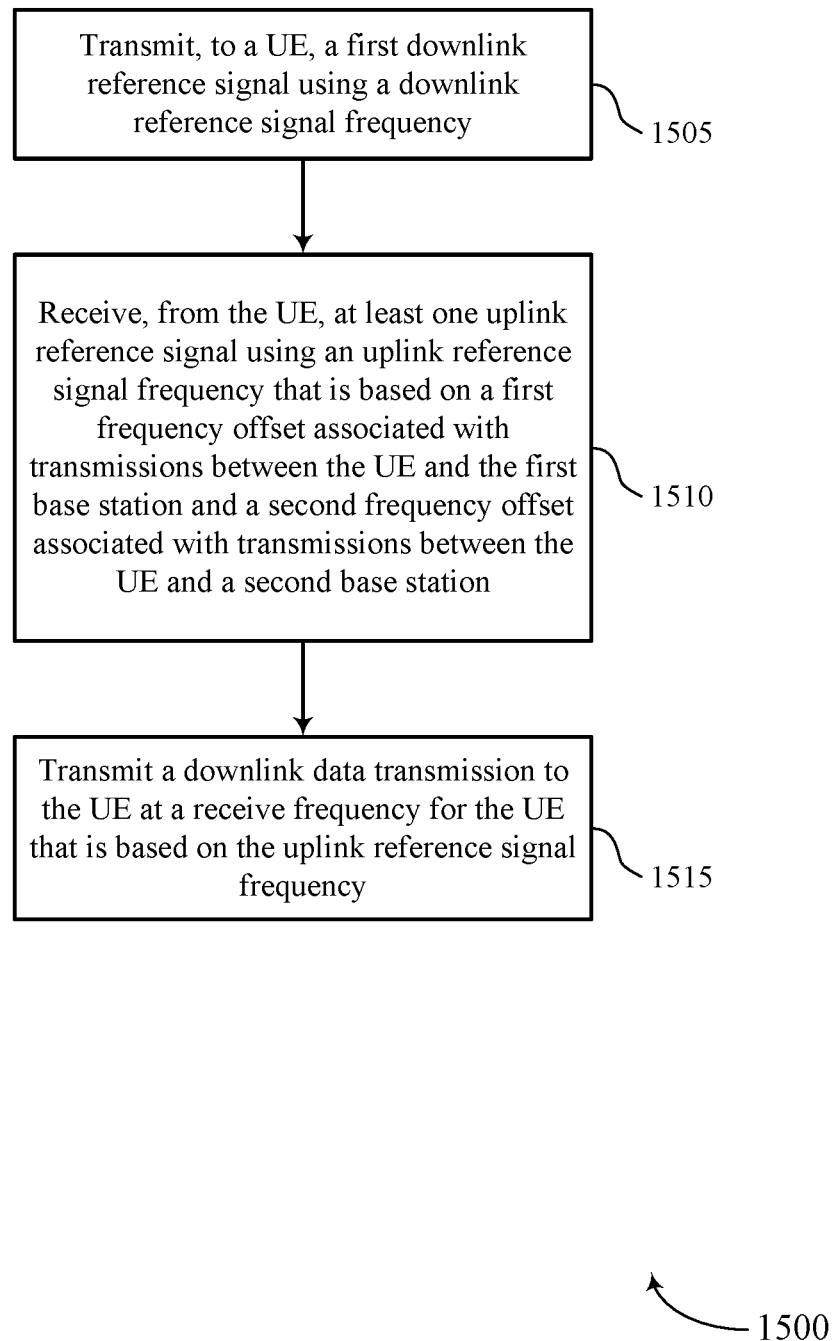

FIG. 15 shows a flowchart illustrating a method 1500 that supports uplink reference signal-based frequency offset pre-compensation in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1505, the base station may transmit, to a UE, a first downlink reference signal using a downlink reference signal frequency. The operations of 1505 may be performed according to the methods described herein. In some examples, aspects of the operations of 1505 may be performed by a downlink reference signal manager as described with reference to FIGS. 8 through 11.

At 1510, the base station may receive, from the UE, at least one uplink reference signal using an uplink reference signal frequency that is based on a first frequency offset associated with transmissions between the UE and the first base station and a second frequency offset associated with transmissions between the UE and a second base station. The operations of 1510 may be performed according to the methods described herein. In some examples, aspects of the operations of 1510 may be performed by an uplink reference signal manager as described with reference to FIGS. 8 through 11.

At 1515, the base station may transmit a downlink data transmission to the UE at a receive frequency for the UE that is based on the uplink reference signal frequency. The operations of 1515 may be performed according to the methods described herein. In some examples, aspects of the operations of 1515 may be performed by a downlink data transmission manager as described with reference to FIGS. 8 through 11.

Figure 16:
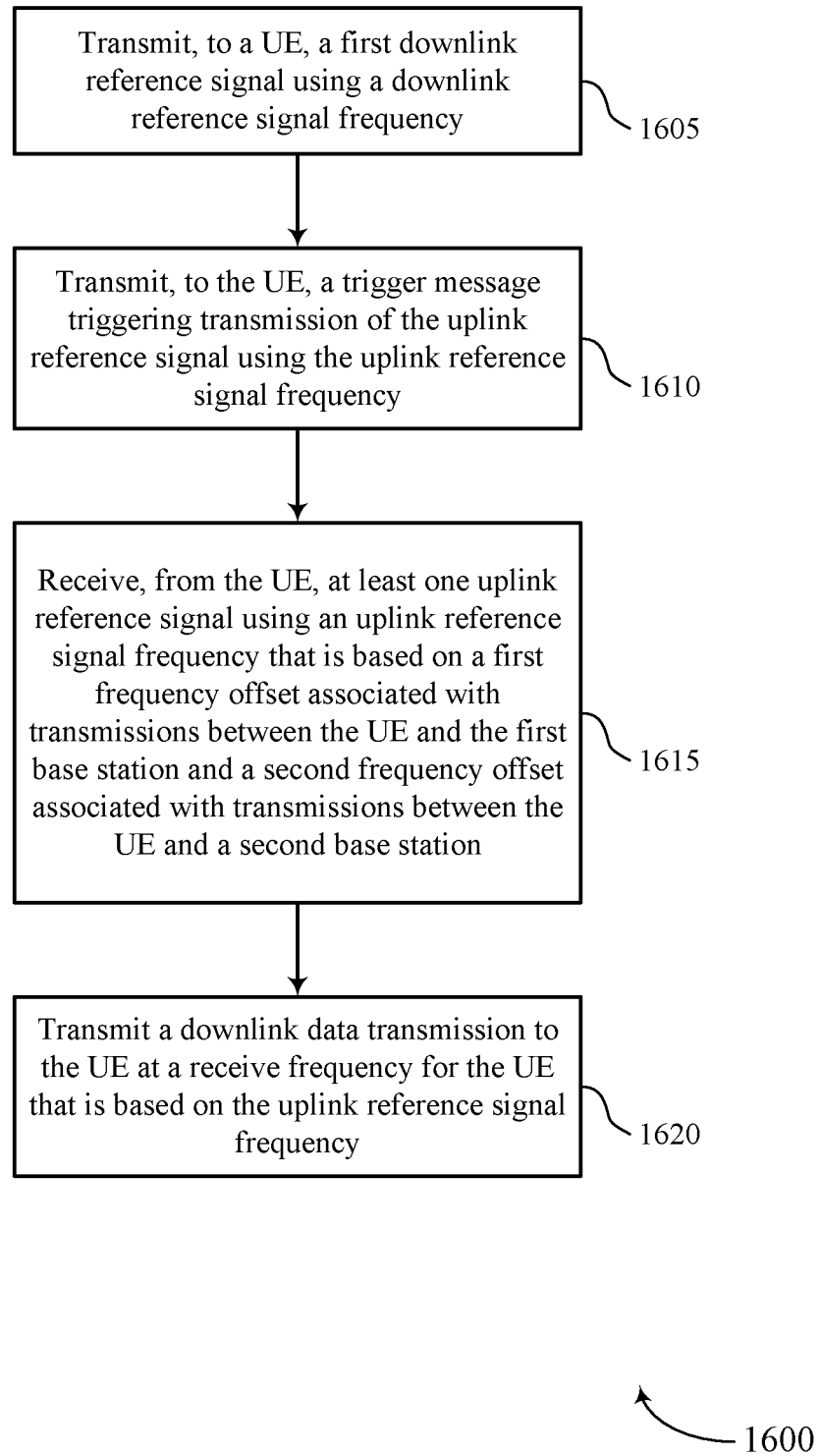

FIG. 16 shows a flowchart illustrating a method 1600 that supports uplink reference signal-based frequency offset pre-compensation in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1605, the base station may transmit, to a UE, a first downlink reference signal using a downlink reference signal frequency. The operations of 1605 may be performed according to the methods described herein. In some examples, aspects of the operations of 1605 may be performed by a downlink reference signal manager as described with reference to FIGS. 8 through 11.

At 1610, the base station may transmit, to the UE, a trigger message triggering transmission of the uplink reference signal using the uplink reference signal frequency. The operations of 1610 may be performed according to the methods described herein. In some examples, aspects of the operations of 1610 may be performed by an uplink reference signal transmission manager as described with reference to FIGS. 8 through 11.

At 1615, the base station may receive, from the UE, at least one uplink reference signal using an uplink reference signal frequency that is based on a first frequency offset associated with transmissions between the UE and the first base station and a second frequency offset associated with transmissions between the UE and a second base station. The operations of 1615 may be performed according to the methods described herein. In some examples, aspects of the operations of 1615 may be performed by an uplink reference signal manager as described with reference to FIGS. 8 through 11.

At 1620, the base station may transmit a downlink data transmission to the UE at a receive frequency for the UE that is based on the uplink reference signal frequency. The operations of 1620 may be performed according to the methods described herein. In some examples, aspects of the operations of 1620 may be performed by a downlink data transmission manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Aspect 1: A method for wireless communication at a user equipment (UE), comprising: determining, based at least in part on a first downlink reference signal transmitted from a first base station using a downlink reference signal frequency, a first frequency offset associated with transmissions between the UE and the first base station; determining, based at least in part on a second downlink reference signal transmitted from a second base station using the downlink reference signal frequency, a second frequency offset associated with transmissions between the UE and the second base station; transmitting, to the first base station and the second base station, at least one uplink reference signal using an uplink reference signal frequency that is based at least in part on the first frequency offset and the second frequency offset; and receiving a downlink data transmission from the first base station or the second base station at a receive frequency that is based at least in part on the uplink reference signal frequency.

Aspect 2: The method of aspect 1, further comprising: identifying a weighting factor to be applied to the first frequency offset, the second frequency offset, or both; and determining the uplink reference signal frequency based at least in part on the first frequency offset, the second frequency offset, and the weighting factor.

Aspect 3: The method of aspect 2, further comprising: receiving a configuration signal indicating the weighting factor.

Aspect 4: The method of any of aspects 1 to 3, further comprising: receiving a configuration signal identifying the downlink reference signal frequency.

Aspect 5: The method of any of aspects 1 to 4, further comprising: transmitting, autonomously by the UE, the uplink reference signal using the uplink reference signal frequency in response to determining the first frequency offset and the second frequency offset.

Aspect 6: The method of any of aspects 1 to 5, further comprising: receiving a trigger message triggering transmission of the uplink reference signal using the uplink reference signal frequency.

Aspect 7: The method of any of aspects 1 to 6, further comprising: identifying a first uplink spatial filter configuration for transmitting the at least one uplink reference signal to the first base station and a second downlink spatial filter configuration associated with the second downlink reference signal; and transmitting the uplink reference signal to the first base station based at least in part on the first uplink spatial filter configuration and to the second base station based at least in part on the second uplink spatial filter configuration.

Aspect 8: The method of aspect 7, wherein the first downlink spatial filter configuration, the second downlink spatial filter configuration, or both, are identified based at least in part on a downlink TCI state.

Aspect 9: The method of aspect 7, wherein the first uplink spatial filter configuration is associated with the first and/or second downlink spatial filter configurations based at least in part spatial relation information indication, an uplink TCI, or both.

Aspect 10: The method of any of aspects 1 to 9, further comprising: receiving a grant scheduling the downlink data transmission; and identifying a spatial filter configuration for a demodulation reference signal transmitted in conjunction with the downlink data transmission based at least in part on the grant.

Aspect 11: The method of any of aspects 1 to 10, further comprising: determining a weighted average of the first frequency offset and the second frequency offset; and identifying the uplink reference signal frequency based at least in part on the weighted average.

Aspect 12: A method for wireless communication at a first base station, comprising: transmitting, to a UE, a first downlink reference signal using a downlink reference signal frequency; receiving, from the UE, at least one uplink reference signal using an uplink reference signal frequency that is based at least in part on a first frequency offset associated with transmissions between the UE and the first base station and a second frequency offset associated with transmissions between the UE and a second base station; and transmitting a downlink data transmission to the UE at a receive frequency for the UE that is based at least in part on the uplink reference signal frequency.

Aspect 13: The method of aspect 12, further comprising: transmitting, to the UE, a configuration signal indicating a weighting factor to be applied to the first frequency offset, the second frequency offset, or both, wherein the UE determines the uplink reference signal frequency based at least in part on the first frequency offset, the second frequency offset, and the weighting factor.

Aspect 14: The method of any of aspects 12 to 13, further comprising: transmitting a configuration signal identifying the downlink reference signal frequency.

Aspect 15: The method of any of aspects 12 to 14, wherein the UE autonomously transmits the uplink reference signal using the uplink reference signal frequency in response to the UE determining the first frequency offset and the second frequency offset.

Aspect 16: The method of any of aspects 12 to 15, further comprising: transmitting, to the UE, a trigger message triggering transmission of the uplink reference signal using the uplink reference signal frequency.

Aspect 17: The method of any of aspects 12 to 16, further comprising: receiving the uplink reference signal from the UE based at least in part on a first uplink spatial filter configuration, wherein the first uplink spatial filter configuration for receiving the uplink reference signal from the UE is based at least in part on a first downlink spatial filter configuration associated with the first downlink reference signal.

Aspect 18: The method of aspect 17, further comprising: transmitting an indication of a downlink spatial relation information indication, an uplink TCI, or both, wherein the first downlink spatial filter configuration is based at least in part on the indication.

Aspect 19: The method of any of aspects 12 to 18, further comprising: receiving a grant scheduling the downlink data transmission, wherein a spatial filter configuration for a demodulation reference signal transmitted in conjunction with the downlink data transmission based at least in part on the grant.

Aspect 20: The method of any of aspects 12 to 19, further comprising: identifying the receive frequency based at least in part on a weighted average of the first frequency offset and the second frequency offset, wherein the receive frequency is based at least in part on the weighted average.

Aspect 21: The method of any of aspects 12 to 20, further comprising: identifying a difference between the uplink reference signal frequency and the downlink reference signal frequency; and identifying the receive frequency for the downlink data transmission to the UE based at least in part on the difference.

Aspect 22: The method of any of aspects 12 to 21, further comprising: coordinating with the second base station to identify the receive frequency to use for the downlink data transmission to the UE.

Aspect 23: An apparatus comprising at least one means for performing a method of any of aspects 1 to 11.

Aspect 24: An apparatus for wireless communications comprising a processor; memory coupled with the processor; and instructions stored in the memory and executable by the processor to cause the apparatus to perform a method of any of aspects 1 to 11.

Aspect 25: A non-transitory computer-readable medium storing code for wireless communications, the code comprising instructions executable by a processor to perform a method of any of aspects 1 to 11.

Aspect 26: An apparatus comprising at least one means for performing a method of any of aspects 12 to 22.

Aspect 27: An apparatus for wireless communications comprising a processor; memory coupled with the processor; and instructions stored in the memory and executable by the processor to cause the apparatus to perform a method of any of aspects 12 to 22.

Aspect 28: A non-transitory computer-readable medium storing code for wireless communications, the code comprising instructions executable by a processor to perform a method of any of aspects 12 to 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a configuration signal indicating a weighting factor to be applied to a first frequency offset, a second frequency offset, or both, wherein the first frequency offset is associated with transmissions between the UE and a first base station and the second frequency offset is associated with transmissions between the UE and a second base station;
    determining, based at least in part on a first downlink reference signal transmitted from the first base station using a downlink reference signal frequency, the first frequency offset;
    determining, based at least in part on a second downlink reference signal transmitted from the second base station using the downlink reference signal frequency, the second frequency offset;
    transmitting, to the first base station and the second base station, at least one uplink reference signal using an uplink reference signal frequency that is based at least in part on the first frequency offset, the second frequency offset, and the weighting factor; and
    receiving a downlink data transmission from the first base station or the second base station at a receive frequency that is based at least in part on the uplink reference signal frequency.

2. The method of claim 1, further comprising:
    receiving a configuration signal identifying the downlink reference signal frequency.

3. The method of claim 1, further comprising:
    transmitting, autonomously by the UE, the uplink reference signal using the uplink reference signal frequency in response to determining the first frequency offset and the second frequency offset.

4. The method of claim 1, further comprising:
    receiving a trigger message triggering transmission of the uplink reference signal using the uplink reference signal frequency.

5. The method of claim 1, further comprising:
    identifying a first uplink spatial filter configuration for transmitting the at least one uplink reference signal to the first base station based at least in part on a first downlink spatial filter configuration associated with the first downlink reference signal and a second downlink spatial filter configuration associated with the second downlink reference signal; and
    transmitting the uplink reference signal to the first base station to the second base station, or both, based at least in part on the first uplink spatial filter configuration.

6. The method of claim 5, wherein the first downlink spatial filter configuration, the second downlink spatial filter configuration, or both, are identified based at least in part on a downlink transmission configuration indicator (TCI).

7. The method of claim 5, wherein the first uplink spatial filter configuration is associated with the first downlink spatial filter configuration and the second downlink spatial filter configuration based at least in part on a spatial relation information indication, an uplink transmission configuration indicator (TCI), or both.

8. The method of claim 1, further comprising:
    receiving a grant scheduling the downlink data transmission; and
    identifying a spatial filter configuration for a demodulation reference signal transmitted in conjunction with the downlink data transmission based at least in part on the grant.

9. The method of claim 1, further comprising:
    determining a weighted average of the first frequency offset and the second frequency offset; and
    identifying the uplink reference signal frequency based at least in part on the weighted average.

10. A method for wireless communication at a first base station, comprising:
    transmitting, to a user equipment (UE), a first downlink reference signal using a downlink reference signal frequency;
    transmitting, to the UE, a configuration signal indicating a weighting factor to be applied to a first frequency offset, a second frequency offset, or both, wherein the first frequency offset is associated with transmissions between the UE and the first base station and the second frequency offset is associated with transmissions between the UE and a second base station;
    receiving, from the UE, at least one uplink reference signal using an uplink reference signal frequency that is based at least in part on the first frequency offset, the second frequency offset, and the weighting factor; and transmitting a downlink data transmission to the UE at a receive frequency for the UE that is based at least in part on the uplink reference signal frequency.

11. The method of claim 10, further comprising:
transmitting a configuration signal identifying the downlink reference signal frequency.

12. The method of claim 10, wherein the UE autonomously transmits the uplink reference signal using the uplink reference signal frequency in response to the UE determining the first frequency offset and the second frequency offset.

13. The method of claim 10, further comprising:
transmitting, to the UE, a trigger message triggering transmission of the uplink reference signal using the uplink reference signal frequency.

14. An apparatus for wireless communication at a user equipment (UE), comprising:
a processor,
memory coupled with the processor; and
instructions stored in the memory and executable by the processor to cause the apparatus to:
receive a configuration signal indicating a weighting factor to be applied to a first frequency offset, a second frequency offset, or both, wherein the first frequency offset is associated with transmissions between the UE and a first base station and the second frequency offset is associated with transmissions between the UE and a second base station;
determine, based at least in part on a first downlink reference signal transmitted from the first base station using a downlink reference signal frequency, the first frequency offset;
determine, based at least in part on a second downlink reference signal transmitted from the second base station using the downlink reference signal frequency, the second frequency offset;
transmit, to the first base station and the second base station, at least one uplink reference signal using an uplink reference signal frequency that is based at least in part on the first frequency offset, the second frequency offset, and the weighting factor; and
receive a downlink data transmission from the first base station or the second base station at a receive frequency that is based at least in part on the uplink reference signal frequency.

15. The apparatus of claim 14, wherein the instructions are further executable by the processor to cause the apparatus to:
receive a configuration signal identifying the downlink reference signal frequency.

16. The apparatus of claim 14, wherein the instructions are further executable by the processor to cause the apparatus to:
transmit, autonomously by the UE, the uplink reference signal using the uplink reference signal frequency in response to determining the first frequency offset and the second frequency offset.

17. The apparatus of claim 14, wherein the instructions are further executable by the processor to cause the apparatus to:
receive a trigger message triggering transmission of the uplink reference signal using the uplink reference signal frequency.

18. The apparatus of claim 14, wherein the instructions are further executable by the processor to cause the apparatus to:

identify a first uplink spatial filter configuration for transmitting the at least one uplink reference signal to the first base station based at least in part on a first downlink spatial filter configuration associated with the first downlink reference signal and a second downlink spatial filter configuration associated with the second downlink reference signal; and
transmit the uplink reference signal to the first base station, to the second base station, or both, based at least in part on the first uplink spatial filter configuration.

19. The apparatus of claim 18, wherein the first downlink spatial filter configuration, the second downlink spatial filter configuration, or both, are identified based at least in part on a downlink transmission configuration indicator (TCI).

20. The apparatus of claim 18, wherein the first uplink spatial filter configuration is associated with the first downlink spatial filter configuration and the second downlink spatial filter configuration based at least in part on a spatial relation information indication, an uplink transmission configuration indicator (TCI), or both.

21. The apparatus of claim 14, wherein the instructions are further executable by the processor to cause the apparatus to:
receive a grant scheduling the downlink data transmission; and
identify a spatial filter configuration for a demodulation reference signal transmitted in conjunction with the downlink data transmission based at least in part on the grant.

22. The apparatus of claim 14, wherein the instructions are further executable by the processor to cause the apparatus to:
determine a weighted average of the first frequency offset and the second frequency offset; and
identify the uplink reference signal frequency based at least in part on the weighted average.

23. An apparatus for wireless communication at a first base station, comprising:
a processor,
memory coupled with the processor; and
instructions stored in the memory and executable by the processor to cause the apparatus to:
transmit, to a user equipment (UE), a first downlink reference signal using a downlink reference signal frequency;
transmit, to the UE, a configuration signal indicating a weighting factor to be applied to a first frequency offset, a second frequency offset, or both, wherein the first frequency offset is associated with transmissions between the UE and the first base station and the second frequency offset is associated with transmissions between the UE and a second base station;
receive, from the UE, at least one uplink reference signal using an uplink reference signal frequency that is based at least in part on the first frequency offset, the second frequency offset, and the weighting factor; and
transmit a downlink data transmission to the UE at a receive frequency for the UE that is based at least in part on the uplink reference signal frequency.

24. The apparatus of claim 23, wherein the instructions are further executable by the processor to cause the apparatus to:
transmit a configuration signal identifying the downlink reference signal frequency.

* * * * *